United States Patent
Kostrzewa et al.

(10) Patent No.: US 11,108,967 B2
(45) Date of Patent: Aug. 31, 2021

(54) INFRARED IMAGING IN MULTIPLE IMAGING MODES SYSTEMS AND METHODS

(71) Applicant: FLIR Systems, Inc., Wilsonville, OR (US)

(72) Inventors: Joseph Kostrzewa, Santa Ynez, CA (US); Naseem Y. Aziz, Goleta, CA (US); John D. Schlesselmann, Goleta, CA (US); Brian B. Simolon, Santa Barbara, CA (US); Theodore B. Hoelter, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 16/511,401

(22) Filed: Jul. 15, 2019

(65) Prior Publication Data
US 2019/0342480 A1 Nov. 7, 2019

Related U.S. Application Data

(63) Continuation of application No. PCT/US2018/015585, filed on Jan. 26, 2018.
(Continued)

(51) Int. Cl.
*H04N 5/235* (2006.01)
*G06T 5/20* (2006.01)
(Continued)

(52) U.S. Cl.
CPC ............ *H04N 5/2351* (2013.01); *G06T 5/20* (2013.01); *G06T 5/50* (2013.01); *H04N 5/243* (2013.01);
(Continued)

(58) Field of Classification Search
None
See application file for complete search history.

(56) References Cited

U.S. PATENT DOCUMENTS 5,200,623 A 4/1993 Cannata
6,384,414 B1 5/2002 Fisher et al.
(Continued)

FOREIGN PATENT DOCUMENTS

| CN | 105190424 | 12/2015 |
| WO | WO 2009/097216 | 8/2009 |
| WO | WO 2016/197010 | 12/2016 |

*Primary Examiner* — Edwin C Gunberg
(74) *Attorney, Agent, or Firm* — Haynes and Boone, LLP

(57) ABSTRACT

Techniques are disclosed for systems and methods for facilitating infrared imaging in multiple imaging modes. A device may include an infrared image capture circuit and at least one processing circuit. The infrared image capture circuit may be configured to detect first infrared data and generate a first pixel value based on the first infrared data and a first imaging mode among multiple imaging modes. The at least one processing circuit may be configured to compare the first pixel value to a set of saturation threshold values associated with the first imaging mode. The at least one processing circuit may be further configured to select an imaging mode among the multiple imaging modes based on the comparison of the first pixel value. The at least one processing circuit may be further configured to set the infrared image capture circuit to generate a second pixel value based on the selected imaging mode.

20 Claims, 15 Drawing Sheets

Related U.S. Application Data

(60) Provisional application No. 62/450,967, filed on Jan. 26, 2017.

(51) Int. Cl.
    *G06T 5/50*         (2006.01)
    *H04N 5/243*     (2006.01)

(52) U.S. Cl.
    CPC ............... *G06T 2207/10048* (2013.01); *G06T 2207/20212* (2013.01)

(56) References Cited

U.S. PATENT DOCUMENTS

| | | |
|---|---|---|
| 6,816,200 B1 | 11/2004 | Gough |
| 7,002,408 B2 | 2/2006 | Roos |
| 7,606,484 B1 * | 10/2009 | Richards ................. G01J 5/602 396/322 |
| 7,786,438 B1 | 8/2010 | DeVilbiss et al. |
| 7,995,859 B2 | 8/2011 | Högasten |
| 8,515,196 B1 | 8/2013 | Högasten |
| 2006/0291849 A1 | 12/2006 | Shamir et al. |
| 2011/0305388 A1 | 12/2011 | Wedi et al. |
| 2012/0111944 A1 | 5/2012 | Gao et al. |
| 2012/0194686 A1 | 8/2012 | Lin et al. |
| 2012/0224788 A1 | 9/2012 | Jia et al. |
| 2014/0037225 A1 | 2/2014 | Högasten et al. |
| 2014/0085482 A1 | 3/2014 | Teich et al. |
| 2014/0092257 A1 | 4/2014 | Högasten et al. |
| 2014/0139685 A1 | 5/2014 | Nussmeier et al. |
| 2014/0198218 A1 * | 7/2014 | Afrooze ................... G06T 5/40 348/164 |
| 2014/0232875 A1 | 8/2014 | Boulanger et al. |
| 2014/0355904 A1 | 12/2014 | Olsson |
| 2015/0226612 A1 | 8/2015 | Palanchoke et al. |
| 2015/0281749 A1 | 10/2015 | Hutchison et al. |
| 2015/0296146 A1 | 10/2015 | Scanlon et al. |
| 2015/0350567 A1 | 12/2015 | Parrish et al. |
| 2016/0343254 A1 | 11/2016 | Rovik et al. |
| 2017/0064213 A1 | 3/2017 | Windmark et al. |

* cited by examiner

|        | Col 1 | Col 2 | Col 3 | Col 4 |
|--------|-------|-------|-------|-------|
| Row 1  | High, 8000 | High, 13000 | High, 13000 | High, 8000 |
| Row 2  | High, 8000 | Low, 6000 | Low, 6000 | High, 8000 |
| Row 3  | High, 8000 | Low, 3500 | Low, 3500 | High, 8000 |
| Row 4  | High, 8000 | High, 8000 | High, 8000 | High, 8000 |

Readout order ↓

INFRARED IMAGING IN MULTIPLE IMAGING MODES SYSTEMS AND METHODS

CROSS-REFERENCE TO RELATED APPLICATIONS

This application is a continuation of International Patent Application No. PCT/US2018/015585 filed Jan. 26, 2018 and entitled "INFRARED IMAGING IN MULTIPLE IMAGING MODES SYSTEMS AND METHODS," which is incorporated herein by reference in its entirety.

International Patent Application No. PCT/US2018/015585 filed Jan. 26, 2018 claims the benefit of and priority to U.S. Provisional Application No. 62/450,967 filed Jan. 26, 2017 and entitled "SYSTEMS AND METHODS FOR INFRARED IMAGING IN MULTIPLE IMAGING MODES," which is incorporated herein by reference in its entirety.

This patent application is related to U.S. patent application Ser. No. 15/832,647 filed Dec. 5, 2017 and entitled "SYSTEMS AND METHODS FOR ENHANCED DYNAMIC RANGE INFRARED IMAGING," which is a continuation-in-part of International Patent Application No. PCT/US2016/035848 filed Jun. 3, 2016 and entitled "SYSTEMS AND METHODS FOR ENHANCED DYNAMIC RANGE INFRARED IMAGING," which in turn claims the benefit of and priority to U.S. Provisional Patent Application No. 62/171,962, filed Jun. 5, 2015 and entitled "SYSTEMS AND METHODS FOR ENHANCED DYNAMIC RANGE INFRARED IMAGING," each of which is incorporated herein by reference in its entirety.

TECHNICAL FIELD

One or more embodiments relate generally to imaging devices and more particularly, for example, to systems and methods for facilitating infrared (IR) imaging in multiple imaging modes.

BACKGROUND

Thermal, such as IR, images of scenes are often useful, for example, for monitoring, inspection and/or maintenance purposes, and surveillance. Typically, a thermal imaging device, such as an IR camera, is provided to capture a series of thermal images and produce a thermal video sequence, where the thermal images may include pixels with data values representing thermal radiation emitted from an observed real world scene.

For example, focal plane arrays (FPAs) that detect IR radiation (e.g., thermal IR radiation) may be used by IR cameras to provide thermal IR images. The thermal IR radiation passing through an optical path of an IR camera may be received by IR detectors of the FPA, which provide image data for pixels of thermal IR images.

For a scene with large temperature variation, it may be impossible to capture the full span of the high intra-scene temperature range with a single exposure of an IR camera. If the IR camera is optimized for lower irradiance, the higher irradiance areas (e.g., the hotter areas) will often be saturated. In this case, pixel values of the thermal IR image for different IR radiation intensities at or above the saturated level may be represented by the same saturation value and are thus not distinguishable from one another in the thermal IR image. If the IR camera is optimized for higher irradiance, the lower irradiance areas (e.g., the cooler areas) may be buried in the noise floor of the IR camera and appear washed out and/or noisy, e.g. due to low signal-to-noise ratio (SNR). For a particular IR camera and expected temperature range of a scene, imaging may be optimized by adjusting shutter speed, integration time, receiving amplifier gain, bias across pixels, speed of associated optics, and/or other parameters associated with the IR camera. However, it may not be possible to fully encompass temperature variations of a scene using a single integration time.

SUMMARY

In one or more embodiments, a device includes an infrared image capture circuit configured to capture a first infrared image associated with a first plurality of pixel values using a first imaging mode of a plurality of imaging modes. Each of the plurality of imaging modes is associated with a respective set of characteristics. The device further includes at least one processing circuit communicatively coupled to the infrared image capture circuit and configured to determine whether at least a threshold number of the first plurality of pixel values exceeds a saturation threshold value. The at least one processor circuit is further configured to maintain the device in a single mode state when less than the threshold number of the first plurality of pixel values is determined to exceed the saturation threshold value, where the single mode state is associated with capture of a single infrared image using one of the plurality of imaging modes. The at least one processor circuit is further configured to transition the device to a superframing state when at least the threshold number of the first plurality of pixel values is determined to exceed the saturation threshold value, where the superframing state is associated with capture of each of at least two infrared images using different imaging modes of the plurality of imaging modes.

In one or more embodiments, a device includes an infrared image capture circuit configured to capture a first infrared image associated with a first plurality of pixel values using is a first imaging mode of a plurality of imaging modes. Each of the plurality of imaging modes is associated with a respective set of characteristics. The device further includes at least one processing circuit communicatively coupled to the infrared image capture circuit. The at least one processing circuit is configured to determine whether at least a threshold number of the first plurality of pixel values exceeds a saturation threshold value. The at least one processing circuit is further configured to maintain the device in the first imaging mode when less than the threshold number of the first plurality of pixel values is determined to exceed the saturation threshold value. The at least one processing circuit is further configured to transition the device from the first imaging mode to a different mode state when at least the threshold number of the first plurality of pixel values is determined to exceed the saturation threshold value.

In one or more embodiments, a device includes an infrared image capture circuit configured to detect first infrared data and generate a first pixel value based on the first infrared data and a first imaging mode of a plurality of imaging modes. The device further includes at least one processing circuit configured to compare the first pixel value to a first set of saturation threshold values associated with the first imaging mode. The at least one processing circuit is further configured to select an imaging mode among the plurality of imaging modes based on the comparison of the first pixel value. The at least one processing circuit is further configured to set the infrared image capture circuit to generate a second pixel value based on the imaging mode selected based on the comparison of the first pixel value.

In one or more embodiments, a method includes detecting first infrared data. The method further includes generating a first pixel value based on the first infrared data and a first imaging mode of a plurality of imaging modes. The method further includes selecting an imaging mode among the plurality of imaging modes for a second pixel value based on the first pixel value and a first set of saturation threshold values associated with the first imaging mode. The method further includes generating the second pixel value based on the selected imaging mode.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 7 illustrates an example of a rectangular array of detectors and a pixel value and an imaging mode associated with each detector in accordance with one or more embodiments of the present disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Figure 1:
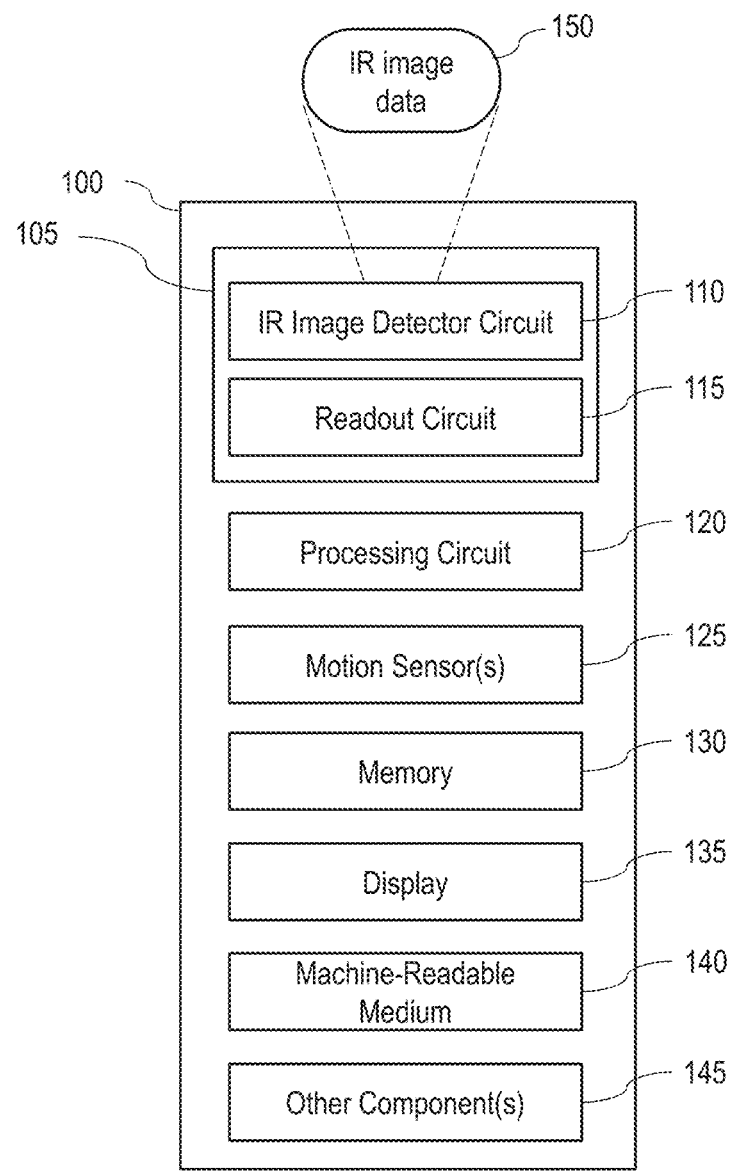
FIG. 1 illustrates a block diagram of an example IR imaging device in accordance with one or more embodiments of the present disclosure.

FIG. 1 illustrates a block diagram of an example IR imaging device 100 (e.g., a thermal IR imaging device) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The IR imaging device 100 includes an IR image capture circuit 105, a processing circuit 120, a motion sensor(s) 125, memory 130, a display 135, a machine-readable medium 140, and/or other components 145. The IR image capture circuit 105 includes an IR image detector circuit 110 (e.g., a thermal IR detector circuit) and a readout circuit 115 (e.g., a readout integrated circuit (ROIC)). In some aspects, the IR image capture circuit 105 may capture (e.g., detect, sense) IR radiation with wavelengths in the range from around 700 nm to around 1 mm, or portion thereof. For example, in some aspects, the IR image capture circuit 105 may be sensitive to (e.g., better detect) mid-wave IR (MWIR) radiation (e.g., electromagnetic radiation with wavelength of 2-5 µm) and/or long-wave IR (LWIR) radiation (e.g., electromagnetic radiation with wavelength of 7-14 µm).

The IR image capture circuit 105 may capture an IR image associated with a scene (e.g., a real world scene). To capture the IR image, the IR image detector circuit 110 may detect IR image data 150 (e.g., in the form of IR radiation) and generate pixel values of the IR image based on the IR image data 150. An IR image may be referred to as an IR frame or an IR image frame. In some cases, the IR image detector circuit 110 may include an array of IR detectors that can detect IR radiation, convert the detected IR radiation into electrical signals (e.g., voltages, currents, etc.), and generate the pixel values based on the electrical signals. Each IR detector in the array may capture a respective portion of the IR image data 150 and generate a pixel value based on the respective portion captured by the IR detector. The pixel value generated by the IR detector may be referred to as an output of the IR detector. The IR detector may be referred to as a detector, sensor, or IR sensor.

The IR image may be, or may be considered, a data structure that includes pixels and is a representation of the IR image data 150, with each pixel having a pixel value that represents IR radiation emitted or reflected from a portion of the scene and received by an IR detector that generates the pixel value. Based on context, a pixel may refer to an IR detector of the IR image detector circuit 110 that generates an associated pixel value or a pixel (e.g., pixel location, pixel coordinate) of the IR image formed from the generated pixel values.

In an aspect, the pixel values generated by the IR image detector circuit 110 may be represented in terms of digital count values generated based on the electrical signals obtained from converting the detected IR radiation. For example, in a case that the IR image detector circuit 110 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the IR detector may be the digital count value output from the ADC circuit. In other cases (e.g., in cases without an ADC circuit), the pixel value may be analog in nature with a value that is, or is indicative of, the value of the electrical signal. In general, a larger amount of IR radiation being incident on and detected by the IR image detector circuit 110 is associated with higher digital count values and higher temperatures.

In various embodiments, the IR image detector circuit 110 may be, may include, or may be a part of an FPA. By way of non-limiting example, the IR image detector circuit 110 may be a microbolometer FPA or a photon detector FPA. A microbolometer FPA may be formed of an array of thermal detectors that detect IR radiation in the form of heat energy and generate pixel values based on the amount of heat energy detected. A microbolometer FPA may include IR detecting materials such as amorphous silicon (a-Si), vanadium oxide ($VO_x$), a combination thereof, and/or other detecting material(s). A microbolometer FPA usually does not require cooling. In an aspect, an IR imaging device (e.g., the IR imaging device 100) equipped with uncooled FPAs (e.g., uncooled microbolometer FPAs) may be referred to as an uncooled IR imaging device (e.g., an uncooled IR camera).

A photon detector FPA may be formed of an array of photon detectors that detect IR radiation in the form of photons and generate the pixel value based on the quantity of photons detected (e.g., energy associated with the photons collected). A photon detector FPA may include IR detecting materials such as indium gallium arsenide (InGaAs), indium antimonide (InSb), indium arsenide (InAs), germanium, a combination thereof, and/or other detecting material(s). A photon detector FPA may include a quantum well infrared photodetector (QWIP). A photon detector FPA usually requires cooling. In an aspect, an IR imaging device (e.g., the IR imaging device 100) equipped with cooled FPAs (e.g., cooled photon detector FPAs) may be referred to as a cooled IR imaging device.

The readout circuit 115 may be utilized as an interface between the IR image detector circuit 110 that detects the IR image data 150 and the processing circuit 120 that processes the detected IR image data 150 as read out by the readout circuit 115. An image capturing frame rate may refer to the rate (e.g., images per second) at which IR images are detected in a sequence by the IR image detector circuit 110 and read out to the processing circuit 120 by the readout circuit 115. The readout circuit 115 may read out the pixel values generated by the IR image detector circuit 110 in accordance with an integration time. In an aspect, for a photon detector FPA, the integration time may be, or may be indicative of, a time interval that begins at a time of collecting (e.g., trapping and retaining) IR radiation and ends at a time of reading out the collected IR radiation. In this regard, signal levels (e.g., IR radiation levels) captured by the IR image capture circuit 105 may depend on the applied integration time. For example, for a given pixel (e.g., IR detector), a longer integration time may be associated with more IR radiation being collected than a shorter integration time. In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of photons (e.g., by photon detectors) and/or heat energy (e.g., by microbolometers).

The processing circuit 120 may perform operations to process the pixel values received from the readout circuit 115. By way of non-limiting example, the processing circuit 120 may perform operations such as non-uniformity correction (NUC), spatial and/or temporal filtering, and/or radiometric conversion on the pixel values. In some cases, the processing circuit 120 may combine multiple IR images (e.g., each IR image associated with a respective set of pixel values) to generate a combined IR image, such as in superframing.

The processing circuit 120 may be implemented as any appropriate processing device, such as, by way of non-limiting example, a central processing unit (CPU), a graphics processing unit (GPU), a digital signal processor (DSP), a logic device, a microcontroller, an application specific integrated circuit (ASIC), a programmable logic device (PLD), a combination thereof, and/or other device. The processing circuit 120 may include combinations of hardware and software processing functionality and may be provided with or communicatively coupled to other components to execute appropriate instructions, such as software instructions and/or processing parameters (e.g., filtering coefficients, NUC correction terms) stored in the memory 130 and/or the machine-readable medium 140.

The motion sensor(s) 125 may be implemented by one or more accelerometers, gyroscopes, and/or other appropriate devices that may be used to detect movement of the IR imaging device 100. The information provided by the motion sensor(s) 125 may facilitate image processing operations (e.g., spatial filtering, temporal filtering) performed by the processing circuit 120, such as by facilitating differentiation between motion in the scene relative to motion of the IR imaging device 100. In some cases, the motion sensor(s) 125 may be implemented as part of the IR imaging device 100 and/or in other device(s) attached to or otherwise interfaced with the IR imaging device 100.

The memory 130 may be utilized to store information for facilitating operation of the IR imaging device 100. The memory 130 may store information such as instructions to be executed by the various components (e.g., the processing circuit 120) of the IR imaging device 100, parameters associated with processing operations (e.g., filtering coefficients), information associated with previously generated images (e.g., for temporal filtering), and/or other information. By way of non-limiting example, the memory 130 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 130 may include volatile memory, such as random-access memory (RAM), dynamic RAM (DRAM), static RAM (SRAM), etc.

The IR imaging device 100 may include the display 135. The display 135 (e.g., screen, touchscreen, monitor) may be used to display captured and/or processed IR images and/or other images, data, and/or information. For example, the images (or a visual representation of the images) may be displayed as individual static images and/or as a series of images in a video sequence. In an aspect, the display 135 may display information such as a legend that relates colors to temperatures. In some cases, the legend may identify a palette (e.g., color palette) being used to represent the images, such as providing a name of the palette (e.g., a name given by a user and/or a developer of the palette).

The display 135 may receive the images in accordance with a display communication protocol and/or specification of the display 135 (e.g., the resolution of the display 135). The IR imaging device 100 may include the machine-readable medium 140. The machine-readable medium 140 may be a non-transitory storage utilized to store instructions and/or processing parameters to be loaded into the memory 130 and utilized by the various components of the IR imaging device 100 (e.g., the IR image capture circuit 105, the processing circuit 120, etc.). In addition, the IR imaging device 100 may include other components 145. By way of non-limiting example, the other components 145 may be used to implement any features of the IR imaging device 100 as may be desired for various applications (e.g., clocks, temperature sensors, a visible light camera, or other components). In various embodiments, the display 135, the machine-readable medium 140, and the other component(s) 145 may be implemented as part of the IR imaging device 100 (as shown in FIG. 1) and/or in other device(s) attached to or otherwise interfaced with the IR imaging device 100.

In one or more embodiments, the IR imaging device 100 may be operated in multiple discrete imaging modes. An IR image may be generated based on pixel values captured using a single imaging mode or a combination of different sets of pixel values captured using different imaging modes. In one or more aspects, the IR imaging device 100 may allow adjustment of shutter speed, integration time, receiving amplifier gain, bias across pixels, speed of associated optics, and/or other adjustments to the IR imaging device 100, to effectuate the imaging modes.

Each imaging mode may be associated with characteristics regarding the capture and/or processing of an IR image. By way of non-limiting example, characteristics associated with the capture of the IR image may include sensitivity, dynamic range, minimum temperature that can be reliably represented, and maximum temperature that can be reliably represented. The sensitivity may be, or may be indicative of, a minimum temperature difference that the IR imaging device 100 (e.g., detectors of the IR image detector circuit 110) can resolve. The dynamic range may be, or may be indicative of, a range (e.g., difference) between the minimum temperature and the maximum temperature that can be represented in an IR image. In some cases, the dynamic range may refer to a ratio of the temperature range (e.g., total representable temperature range) to a smallest detectable temperature. Areas of a scene that are below the minimum temperature may be buried in the noise floor of the IR imaging device 100 and appear washed out and/or noisy in the IR image. Areas of a scene above the maximum temperature cause saturation in the IR image, in which the areas that are saturated are represented in the same manner as areas at the maximum temperature. For example, when the IR image detector circuit 110 generates digital count values using an ADC circuit, temperatures at or above the maximum temperature may all be mapped to the highest value that can be represented by the ADC circuit (e.g., 16,383 for a 14-bit ADC circuit). In other words, the IR image does not distinguish between areas above the maximum temperature and areas at the maximum temperature. In some aspects, the captured IR image may be processed differently (e.g., using different processing pipelines) based on the imaging mode utilized to capture the IR image. An example of a processing pipeline is described with respect to FIG. 4.

In an embodiment, each imaging mode may be associated with one or more different palettes (e.g., color palettes). It is noted that palettes are provided as one example parameter that affects image presentation. Other parameters that may affect image presentation may include automatic gain control (AGC) parameters such as a maximum gain, gamma (e.g., automatic color enhancement (ACE)), and linear percent. One or more of these parameters may be associated with each imaging mode, alternatively or in addition to associating a palette with each imaging mode.

The processing circuit 120 may map the value of each pixel in an infrared image to a corresponding color value or grayscale value according to a palette, such as for display purposes (e.g., using the display 135). In some cases, the processing circuit 120 may generate pixel values for the infrared image and apply an associated palette(s) to the generated pixel values. In these cases, the palette may effectively be a mapping that is applied during post-processing. In this regard, the user may tailor the visual representation of the infrared image by changing the palette applied to the infrared image.

In an aspect, the palette being used for displaying the captured and/or processed IR image may automatically change when the imaging mode changes. Such automatic change may provide a visible indication to the user that the imaging mode has changed. The palettes utilized to provide the visual representations of the infrared images may be designed and/or selected based on perceptual color distance (e.g., perceived color contrast) between pixels representing infrared intensity levels (e.g., temperatures) that are different but nearby each other. In some cases, to facilitate improved user experience, palettes associated with (e.g., utilized to display) each imaging mode or with each combination of imaging modes (e.g., a superframing state) may be selected, defined, or redefined (e.g., from factory-set default settings), by the user.

An easily interpretable visualization of an infrared image may differ for different users and/or different applications. By way of non-limiting example, the palettes may include a rainbow palette (e.g., designed around the colors of a rainbow), a grayscale palette (e.g., also referred to herein as a white-hot palette), an ironbow palette (e.g., designed around the colors of incandescent objects), a lava palette, and a medical palette. In an aspect, when displaying the infrared image, a legend associated with a palette may also be displayed with the infrared image to associate different color values (e.g., RGB values) or grayscale values (e.g., intensity values) of the infrared image with a respective temperature or temperature range.

As an example, a default setting may be to select the ironbow palette for facilitating display of an infrared image associated with a high-gain mode and select the lava palette for facilitating display of an infrared image associated with a low-gain mode. In this example, in one case, when an infrared image has first pixels associated with the high-gain mode and second pixels associated with the low-gain mode, the ironbow palette may be applied to the first pixels and the lava palette may be applied to the second pixels. In another case, the ironbow palette may be used for the infrared image when the number of first pixels exceeds the number of second pixels, and the lava palette may be used for the infrared image when the number of second pixels exceeds the number of first pixels. In a case that the infrared image has pixels generated based on a combination of two or more gain modes, a default setting may be to select the ironbow palette, lava palette, or other palette different from the ironbow palette and lava palette. Other manners by which to associate palettes with imaging modes may be utilized, with the association being user defined in some cases. In this regard, in an aspect, the user may adjust the default settings, redefine any default palettes (e.g., redefine mapping provided by the ironbow palette), create new user-defined palettes, and/or other manners by which to customize the visualization of infrared images by the user.

It is noted that the sensitivity and the dynamic range may be represented using various quantities, including temperatures, digital count values, electrical measurements (e.g., voltages and/or currents generated by the IR image detector circuit 110), irradiance values, and/or other quantities.

In an aspect, using a longer integration time may optimize the IR imaging device 100 for a narrower temperature range (e.g., a smaller dynamic range) and/or a lower maximum temperature, as detectors of the IR image detector circuit 110 receiving IR radiation from high irradiance/temperature areas (e.g., objects with high temperatures) will be saturated. In an aspect, using a shorter integration time may optimize the IR imaging device 100 for a broader temperature range (e.g., a larger dynamic range) and/or a higher temperature maximum temperature. In some cases, when the integration time is too short, the irradiance for all areas of a scene may be so low that all the areas have insufficient SNR (e.g., since the detectors receive low IR radiation). For areas with insufficient SNR, the IR image may appear noisy/grainy when displayed. In some cases, a first imaging mode may utilize a longer integration time whereas a second imaging mode may utilize a shorter integration time.

Utilizing one or more of the imaging modes may facilitate accommodation of scenes of varying irradiance/temperature levels. In one or more embodiments, the use of multiple image capture modes may facilitate the capture of image scenes that involve large variations in temperature by an IR imaging device (e.g., an uncooled IR imaging device). The imaging modes available to the IR imaging device 100 may include, for example, a high-gain (HG) mode and a low-gain (LG) mode. The high-gain mode may be associated with higher sensitivity, whereas the low-gain mode may be associated with higher dynamic range (e.g., a broader temperature range). In this regard, the high-gain mode may be associated with a lower dynamic range (e.g., narrower temperature range) than the low-gain mode. The low-gain mode may have a lower minimum temperature and/or a higher maximum temperature than the high-gain mode. In some cases, the high-gain mode may utilize a longer integration time and the low-gain mode may utilize a shorter integration time. An IR image generated using the high-gain mode may be referred to as a high-gain IR image. An IR image generated using the low-gain mode may be referred to as a low-gain IR image.

The high-gain mode may provide higher sensitivity but saturate when imaging relatively hot (or cold) objects, whereas the low-gain mode may provide greater scene temperature range but lower sensitivity. In this regard, the higher sensitivity of the high-gain mode may be supplemented by the higher dynamic range of the low-gain mode. Thus, the utilization of IR images captured using different imaging modes (e.g., the high-gain and low-gain modes) may allow generation of a combined IR image that exhibits the higher sensitivity of the high-gain mode (e.g., over at least a portion of the scene temperature range) and the higher dynamic range of the low-gain mode.

In some embodiments, the IR imaging device 100 may be operated in other modes aside from the high-gain and low-gain modes, such as a medium-gain mode with sensitivity and/or dynamic range between those of the high-gain mode and low-gain mode. Additional imaging modes may allow for finer tuning and/or extension of the sensitivity, dynamic range, minimum temperature, and/or maximum temperature to accommodate various scenes/applications that may be encountered by the IR imaging device 100. In an aspect, each of these imaging modes may have a set of associated palettes (e.g., color palettes) utilized to display the captured and/or processed images. Such association of imaging modes with palettes may be set by the user and/or a developer of the palettes.

In an aspect, the palette used to display captured and/or processed images may automatically change in response to an associated change from any one of the imaging modes (e.g., HG mode) to another one of the imaging modes (e.g., LG mode). Such automatic changing of the palette may provide a visible indication (e.g., to the user) that the imaging mode (e.g., gain state) has changed, and/or may allow tailoring of the image presentation of the images provided in each imaging mode through use of the palettes. For example, in firefighting applications, or other applications in which the imaging mode may change often, the automatic change may provide a visible indication that allow users (e.g., firefighters, observers of the situation, and/or others) to assess changes in the environment. In some cases, the users may toggle between different palettes and/or adjust each palette to conveniently adjust image presentation, thus providing user customization and facilitating improved user experience.

Figure 2:
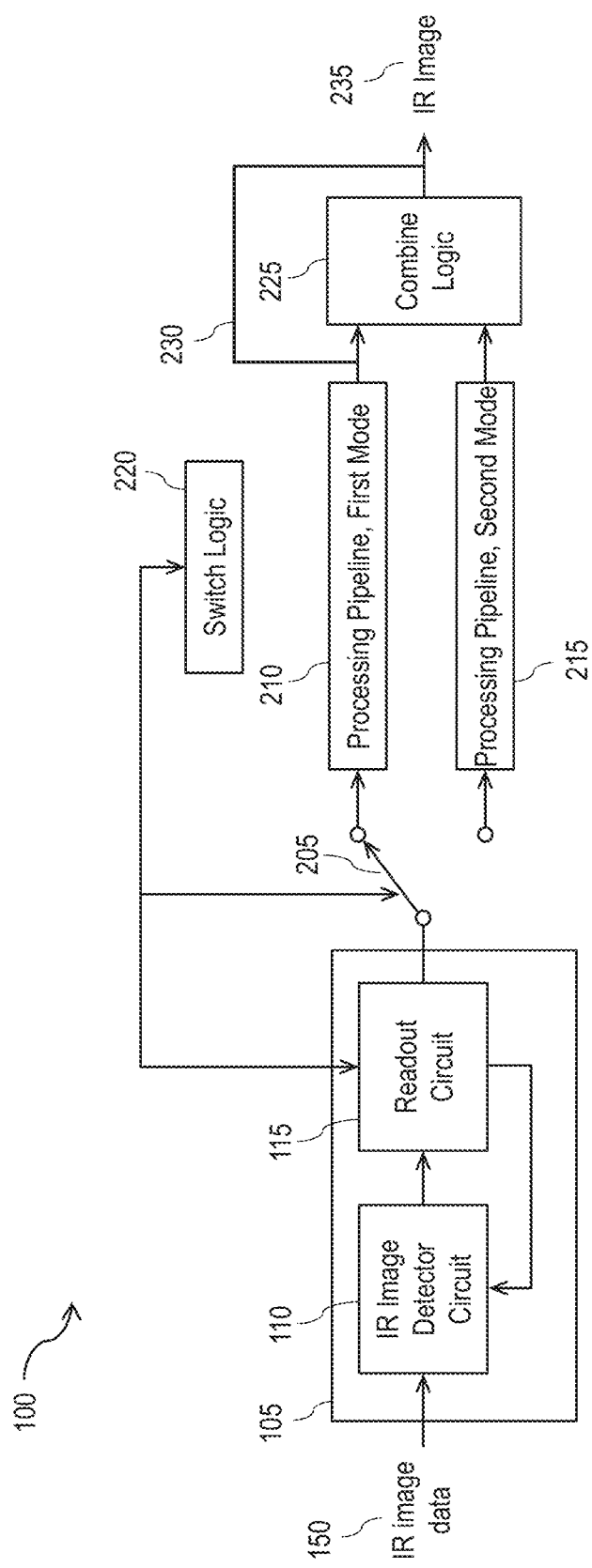
FIGS. 2 and 3 illustrate example IR imaging devices in accordance with one or more embodiments of the present disclosure.

FIG. 2 illustrates an example of the IR imaging device 100, or portion thereof, in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The IR imaging device 100 includes the IR image capture circuit 105, a switch 205, a processing pipeline 210, a processing pipeline 215, switch logic 220, and combine logic 225. The IR image capture circuit 105 includes the IR image detector circuit 110 and the readout circuit 115. The processing pipelines 210 and 215 may be referred to as thermal pipelines. The readout circuit 115 may be utilized as an interface between the IR image detector circuit 110 that detects the IR image data 150 and a signal processing circuit(s) (e.g., the processing pipelines 210 and 215, the combine logic 225) that processes the detected IR image data 150 as read out by the readout circuit 115. In some embodiments, the processing circuit 120 shown in FIG. 1 may include the switch logic 220, the processing pipelines 210 and 215, and/or the combine logic 225, and/or portions thereof. In other embodiments, the IR image capture circuit 105 or portion thereof (e.g., the readout circuit 115) may include the switch logic 220 or portion thereof.

In FIG. 2, the IR imaging device 100 may be operated in a first imaging mode and/or a second imaging mode. When the IR imaging device 100 is operated in the first imaging mode, the switch 205 may be configured to couple the readout circuit 115 to the processing pipeline 210 associated with the first imaging mode. The readout circuit 115 may provide (e.g., route) the IR image generated by the IR image detector circuit 110 to the processing pipeline 210. When the IR imaging device 100 is operated in the second imaging mode, the switch 205 may be configured to couple the readout circuit 115 to the processing pipeline 215 associated with the second imaging mode. The readout circuit 115 may provide the IR image data obtained from the IR image detector circuit 110 to the processing pipeline 215.

For explanatory purposes throughout the present disclosure, unless otherwise indicated, the first imaging mode may be the high-gain mode associated with a higher sensitivity than the low-gain mode and the second imaging mode may be the low-gain mode associated with a higher dynamic range than the high-gain mode.

To configure the switch 205, the switch logic 220 may generate a control signal(s) to couple the readout circuit 115 to one of the processing pipeline 210 or 215. The processing pipelines 210 and 215 may be associated with processing parameters and/or processing operations associated with (e.g., optimized for) the first and second imaging modes, respectively. In this regard, the processing pipeline 210 and the processing pipeline 215 generate an output IR image for the first imaging mode and the second imaging mode, respectively. An example of the processing pipeline 210 is described with respect to FIG. 4.

In some embodiments, the IR imaging device 100 may be operated in a single mode state or a superframing state. In the single mode state, an IR image 235 may be generated strictly based on an IR image (e.g., pixel values used to form the IR image) captured and processed using a single imaging mode. In an aspect, the single imaging mode utilized in the single mode state may be the imaging mode (e.g., among imaging modes available to the IR imaging device 100) associated with the highest sensitivity (e.g., the first imaging mode). In these aspects, the IR imaging device 100 may capture an IR image based on the detected IR image data 150 using the IR image capture circuit 105 and process the captured IR image using the processing pipeline 210 to generate an output IR image. In the single mode state, the processing pipeline 215 associated with the second imaging mode is not utilized to generate an output IR image.

In some cases, the processing pipeline 210 may bypass the combine logic 225 (e.g., via a communication path 230) and provide its output IR image as the IR image 235. For example, the processing pipeline 210 may provide its output IR image to a storage device (e.g., the memory 130) or an interface thereof, a presentation display (e.g., the display 135) or interface thereof, and/or for additional processing without its output IR image being routed through the combine logic 225. In other cases, the combine logic 225 may receive the output IR image of the processing pipeline 210 and pass the output IR image as the IR image 235 without further processing, since no combining is utilized in the single mode state.

When the IR imaging device 100 is operated in the superframing state, the IR image 235 may be generated based on an IR image captured and processed using the first imaging mode and an IR image captured and processed using the second imaging mode. The processing pipeline 210 may provide a first-mode IR image (e.g., high-gain IR image) to the combine logic 225 and the processing pipeline 215 may provide a second-mode IR image (e.g., low-gain IR image) to the combine logic 225. The combine logic 225 may determine portions (e.g., pixel locations, pixel coordinates) of the first-mode IR image with pixel values that exceed a saturation threshold value, referred to as threshold-exceeding pixels; portions of the first-mode IR image with pixel values that do not exceed the saturated threshold value, referred to as non-threshold-exceeding pixels; and portions of the second-mode IR image that correspond to the threshold-exceeding pixels of the first-mode IR image. The combine logic 225 may generate the output IR image based on the non-threshold-exceeding pixels of the first-mode image and pixel values of the portions of the second-mode IR image that correspond to the threshold-exceeding pixels of the first-mode IR image. In some cases, the processing pipelines 210 and/or 215 may include T-linear conversion to facilitate the combining of images in the combine logic 225.

Accordingly, information of pixels of the first-mode IR image that are saturated (or sufficiently close to being saturated) may be replaced with, or blended/fused with, information of corresponding pixels in the second-mode IR image. The combine logic 225 may generate the output IR image 235 on a per-pixel basis. As a result, the IR image 235 may be a stitched image or a blended image of pixels from both the first-mode IR image and the second-mode IR image.

In some embodiments, the IR imaging device 100 may transition from the single mode state to the superframing state based on characteristics of a previous IR image captured when the IR imaging device 100 is operating in the single mode state. For example, the IR imaging device 100 may transition to the superframing state when at least a threshold number of pixel values of the previous IR image captured when the IR imaging device 100 is operating in the single mode state exceeds the saturation threshold value. In some cases, an indication (e.g., one or more bits) as to whether at least the threshold number of pixel values exceeds the saturation threshold value may be provided (e.g., by the readout circuit 115) to the switch logic 220, from which the switch logic 220 can generate a control signal(s) to the readout circuit 115 and/or the switch 205 to effectuate a transition (if needed). Once in the superframing state, the IR imaging device 100 may transition from the superframing state to the single mode state when the number of threshold-exceeding pixels in a first-mode IR image falls below a threshold number of pixel values.

The saturation threshold value may be a preset value. In some cases, pixel values that exceed the saturation threshold value may be, or may be considered to be, at or near saturation. The saturation threshold value may be provided in various quantities, such as digital count values, irradiance values, and temperatures for example. Similarly, the threshold number of pixel values for transitioning to superframing state or out of superframing state may be a preset number. In this regard, the threshold number of pixel values for transitioning from the superframing state to the single mode state may be the same as, or may be different from, the threshold number of pixel values for transitioning from the single mode state to the superframing state.

The threshold number of pixel values and/or the saturation threshold value may be represented as absolute values and/or as percentages. For example, for a 256×256 pixel array (e.g., the IR image detector circuit 110 includes 65,536 detectors), the threshold number can be set to 6,554 pixels or, equivalently, around 10% of the total number of pixels. In this case, the processing circuit 120 determines whether at least 6,554 pixels in the 256×256 pixel array have pixel values that exceed the saturation threshold value. As an example, the saturation threshold value may be set to a digital count value of 9,830 (e.g., around 60% of the maximum digital count value representable using 14 bits). As another example, the saturation threshold value may be set to a temperature of 150° C. As another example, the saturation threshold value may be set to the maximum count value that can be represented by the IR image capture circuit 105 (e.g., 16,383 for an ADC circuit with 14-bit dynamic range).

The threshold number and/or the saturation threshold value may be set based on application. For example, firefighting applications may involve situations in which it is undesirable for an IR image output from the IR imaging device 100 to have any saturated pixels, whereas other applications may have less stringent requirements regarding the presence of saturated pixels. In some cases, the IR imaging device 100 may have multiple preset values for the threshold number and/or the saturation threshold value from which a user may select and/or the user may manually set the threshold number and/or the saturation threshold value.

The use of the superframing state, in which IR images generated using different imaging modes are combined, facilitates extension of the dynamic range of the IR imaging device 100, e.g. relative to a case in which a single imaging mode associated with a lower dynamic range is used. In the case that two imaging modes are combined for the superframing state, an output frame rate (e.g., a rate at which an IR image sequence is output) associated with the superframing state is generally half that of the single mode state.

In one or more embodiments, the IR imaging device 100 may operate in the single mode state (e.g., using the first imaging mode) by default, unless a saturation event(s) causes the IR imaging device 100 to transition out of the single mode state. In some cases, a saturation event is considered to have occurred when at least a threshold number of pixel values exceeds the saturation threshold value. In this regard, the IR imaging device 100 may utilize the single mode state by default to maintain high sensitivity and faster output frame rate when an extended dynamic range is not needed (e.g., the captured IR image has few or no saturated pixels), and transition to the superframing state (associated with slower output frame rate) when needed to extend the dynamic range. For example, the IR imaging device 100 may transition to the superframing state when very hot objects enter a scene, in which case an extended dynamic range is utilized to capture a temperature range that encompasses the higher temperatures and/or broader temperature range of the scene due to the hot objects.

In some aspects, the subject technology may facilitate superframing for uncooled IR detectors, which are generally associated with lower frame rates (e.g., 60 Hz or less) than cooled IR detectors. In this regard, the frame rate of the IR imaging device 100 may be maintained at a higher frame rate (e.g., around 60 Hz) in the single mode state, except when an extended dynamic range (e.g., achieved by using the superframing state) is needed. For example, in the case that the IR imaging device 100 is uncooled, the output frame rate associated with the single mode state may be around 60 Hz whereas the output frame rate associated with the superframing state using two imaging modes may be around 30 Hz.

Figure 3:
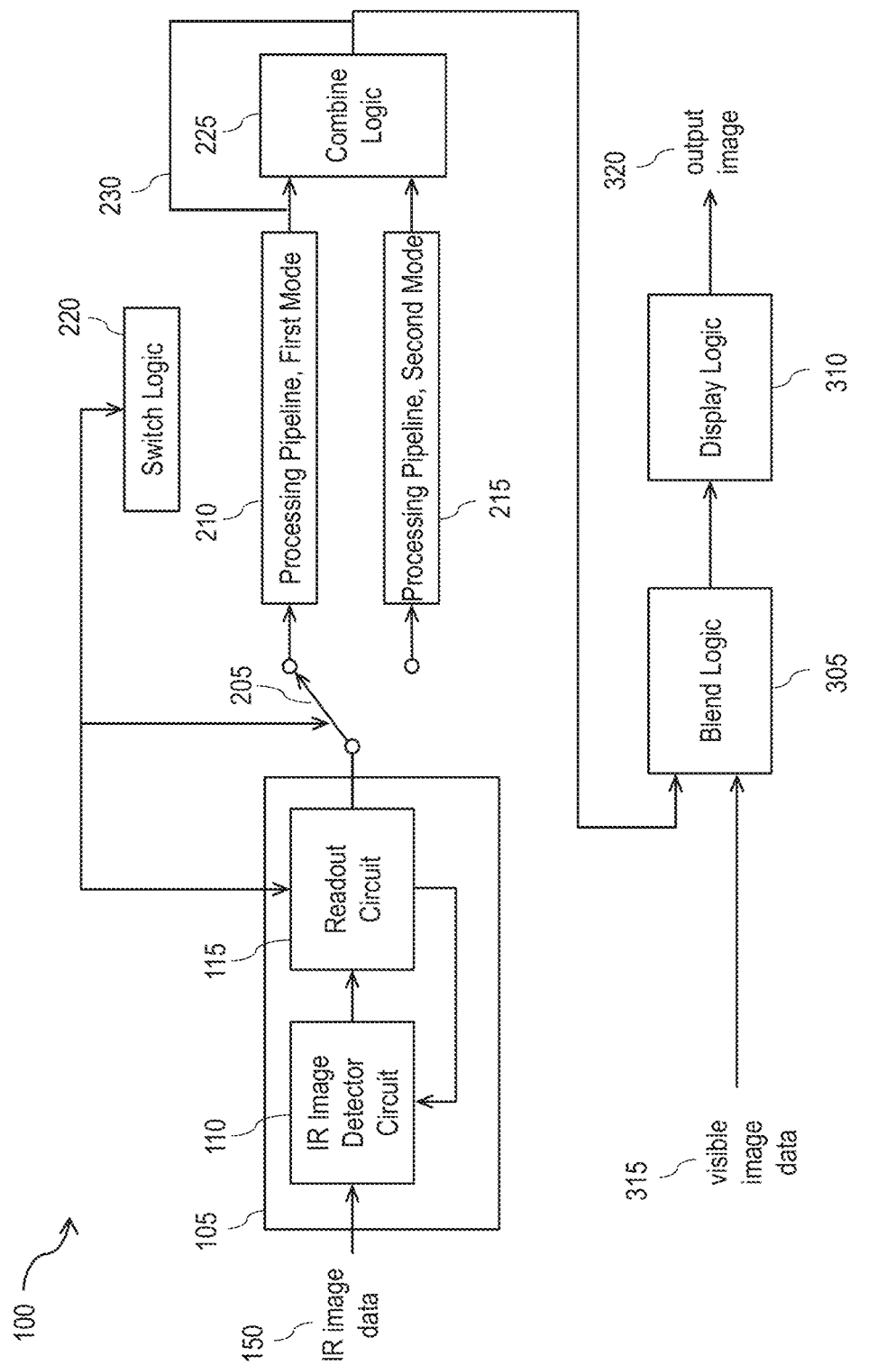

FIG. 3 illustrates an example of the IR imaging device 100, or portion thereof, in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. The description from FIG. 2 generally applies to FIG. 3, with examples of differences between FIG. 2 and FIG. 3 and other description provided herein for purposes of clarity and simplicity.

The IR imaging device 100 includes the IR image capture circuit 105, the switch 205, the processing pipeline 210, the processing pipeline 215, the switch logic 220, the combine logic 225, blend logic 305, and display logic 310. In FIG. 3, the IR imaging device 100 may be capable of capturing visible image data 315 (e.g., from the visible spectrum) and/or receiving the visible image data 315 from another imaging device. In some cases, the IR image data 150 and the visible image data 315 may be captured in a synchronized fashion, such that the IR image data 150 and the visible image data 315 are representative of the same scene at the same (or nearly the same) point in time. In some cases, offsets in time between the capture of the IR image data 150 and the visible image data 315 may be known and compensated for, such as via calibration, buffering, and/or post-processing (e.g., in the blend logic 305).

The blend logic 305 may be utilized to combine/blend the visible image data 315 with an IR image (e.g., output from the processing pipeline 210 or the combine logic 225) to generate a combined/blended image that retains color information (e.g., associated with the visible spectrum) and IR information (e.g., IR luminance information) from the IR image. The display logic 310 may be utilized to provide the combined/blended image for display in a presentation device (e.g., the display 135) included in or otherwise coupled to the IR imaging device 100. For example, the display logic 310 may process the combined/blended image such that it is in accordance with a display communication protocol and/or specification of the presentation display (e.g., the resolution of the display 135), and provide for display a processed combined/blend image 320 to the presentation display.

Although FIGS. 2 and 3 illustrate examples of the IR imaging device 100, other manners by which to implement the IR imaging device 100 may be utilized. Additional components, different components, and/or fewer components may be provided. In some cases, the processing pipelines 210 and 215 may be two separate processing pipelines that can be operated in parallel. In some cases, rather than having two separate processing pipelines, the processing pipelines 210 and 215 may be a single pipeline that can be configured to adjust processing parameters as needed to process an IR image (or portion thereof) in the first imaging mode or the second imaging mode. In these cases, the switch 205 may represent the setting/adjusting (e.g., switching) of parameters to those of the appropriate imaging mode for processing an IR image (or portion thereof).

In some cases, the processing circuit 120 includes the blend logic 305 and/or the display logic 310. For example, the example of the IR imaging device 100 shown in FIG. 2 might include display logic (e.g., the display logic 310) and/or the example of the IR imaging device 100 shown in FIG. 3 might not include the display logic 310. In some cases, the blend logic 305 and/or the display logic 310 may be in a device separate from the IR imaging device 100, and may be communicatively coupled to the IR imaging device 100 based on a wired and/or wireless connection between the device and the IR imaging device 100.

Figure 4:
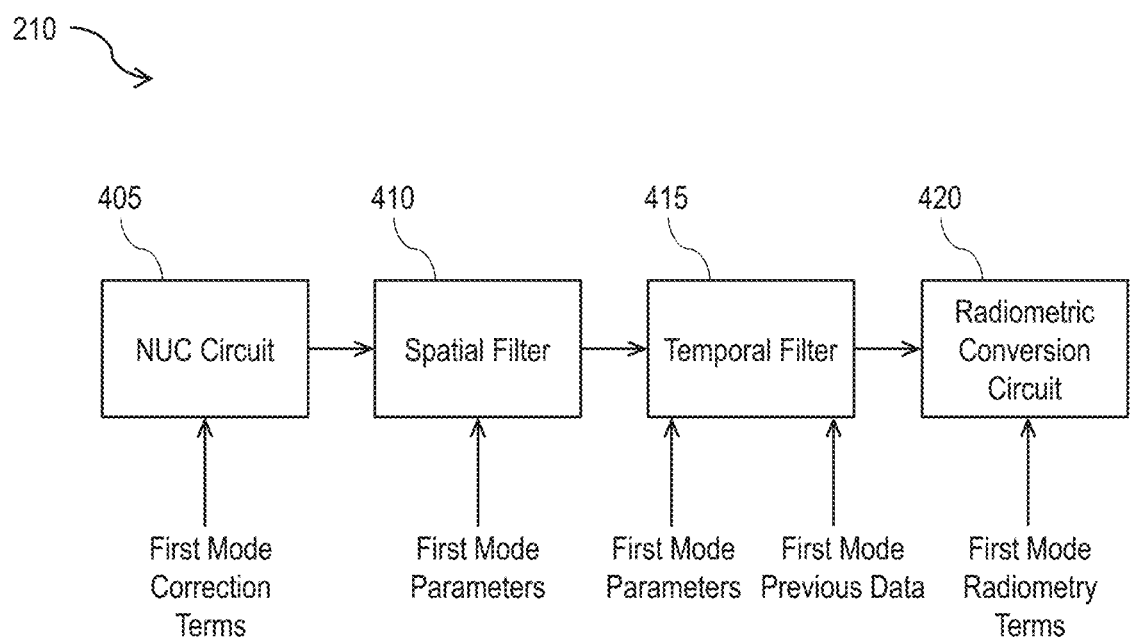
FIG. 4 illustrates an example of an example processing pipeline in accordance with one or more implementations of the present disclosure.

FIG. 4 illustrates an example of the processing pipeline 210 of FIG. 2 in accordance with one or more implementations of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The processing pipeline 210 includes a non-uniformity correction (NUC) circuit 405, a spatial filter 410, a temporal filter 415, and a radiometric conversion circuit 420. With reference to FIG. 2 or 3, the NUC circuit 405 may be coupled to the readout circuit 115 via the switch 205 and the radiometric conversion circuit 420 may be coupled to the combine logic 225. The NUC circuit 405 may perform NUC on pixel values received from the readout circuit 115 to compensate for non-uniform responses among individual IR detectors of the IR image detector circuit 110 to incident IR radiation. The NUC may be performed on the pixel values based on correction terms associated with the first imaging mode.

The spatial filter 410 may receive pixel values output from the NUC circuit 405 and perform spatial filtering on the pixel values in the spatial domain based on spatial filter parameters (e.g., filter coefficients). The temporal filter 415 may receive pixel values output from the spatial filter 410 and perform temporal filtering on the pixel values in the temporal domain based on temporal filter parameters and information associated with a previous IR image(s) (e.g., a previous IR image(s) generated using the processing pipeline 210 and/or 215). In some cases, the temporal filtering may occur prior to the spatial filtering. In some cases, the spatial filtering and the temporal filtering may occur together (e.g., filtering may occur in the space and time domains together), rather than as two discrete, sequential filtering operations. The filtering may be utilized to reduce noise associated with a pixel value of a pixel for an IR image based on a pixel value(s) of a neighboring pixel(s) in the same IR image (e.g., spatial filtering) and/or a pixel value(s) of a pixel(s) of a previous IR image(s) (e.g., temporal filtering).

The radiometric conversion circuit 420 may receive pixel values output from the temporal filter 415. The radiometric conversion circuit 420 may convert the received pixel values to pixel value outputs associated with the first imaging mode. For example, the radiometric conversion circuit 420 may perform scaling or other processing on the received pixel values to generate the first-mode radiometric image in accordance with radiometry terms of the first imaging mode. In an aspect, radiometric conversion may be utilized to process (e.g., transform) pixel values to be proportional to scene temperature.

In some cases, prior to radiometric conversion, pixel values are proportional to incident irradiance. For example, the radiometric conversion may include a conversion (e.g., non-linear conversion) based on Planck's equation (or inverse thereof), which describes the conversion between scene temperature and irradiance. In some cases, such an equation may have no closed-form solution. An approximation may be provided in a form of Signal_Out=B/ln[R/(Signal_In−O)+F], where R, F, B, and O are radiometric terms. R, F, B, and O have constant values, and are generally calibrated by curve-fitting pixel output for a number of known input scene temperatures. The first imaging mode and second imaging mode generally do not have the same values for the radiometric terms.

The various terms, parameters, previous IR image(s), etc. may be stored in local buffers of the components themselves (e.g., memory of the NUC circuit), the memory 130, and/or other memory communicatively coupled to or otherwise accessible to the IR imaging device 100. In some embodiments, the processing pipeline 215 of FIG. 2 has similar components (e.g., NUC circuit, spatial filter, etc.) as those shown for the processing pipeline 210 in FIG. 4. The processing pipeline 215 may have its own set of correction terms, filtering parameters (e.g., noise filtering parameters), radiometric terms, etc. specific for and/or optimized for the second imaging mode. In some cases, a palette may be applied to an output of the processing pipeline 210 or 215 to provide a visualization of the IR images.

Figure 5:
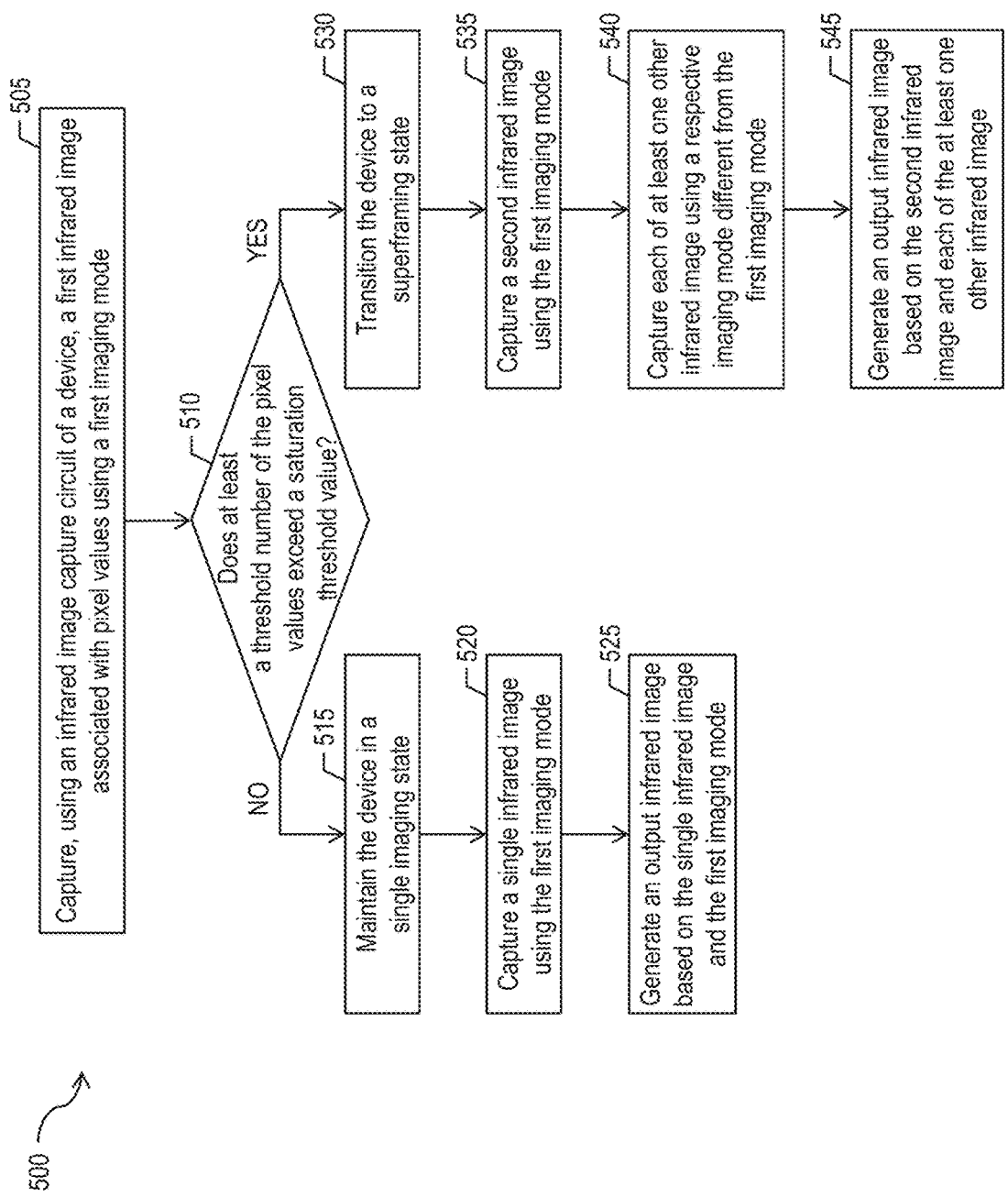
FIGS. 5 and 6 illustrate a flow diagram of example processes for facilitating IR imaging in multiple imaging modes in accordance with one or more embodiments of the present disclosure.

FIG. 5 illustrates a flow diagram of an example process 500 for facilitating IR imaging in multiple imaging modes in accordance with one or more embodiments of the present disclosure. For explanatory purposes, the example process 500 is primarily described herein with reference to the IR imaging device 100 of FIGS. 1-3; however, the example process 500 is not limited to the IR imaging device 100 of FIGS. 1-3. Note that one or more operations may be combined, omitted, and/or performed in a different order as desired. In one or more embodiments, the blocks of FIG. 5 may be performed for each IR image captured by the IR image capture circuit 105 using the first imaging mode.

At block 505, the IR image capture circuit 105 captures a first IR image associated with (e.g., formed of/from) pixel values using a first imaging mode among multiple imaging modes available to the IR imaging device 100. In some cases, the IR imaging device 100 is operating in a single mode state at block 505. As indicated previously, in some cases, the first imaging mode may be the imaging mode associated with the highest sensitivity (e.g., but lowest dynamic range). For example, the first imaging mode may be the high-gain mode. The first IR image may be captured by detecting IR image data 150 (e.g., in the form of IR radiation) and generating the pixel values that form the first IR image based on the detected IR image data 150. In some cases, the IR image detector circuit 110 includes multiple detectors (e.g., thermal detectors), with each detector generating a pixel value based on the portion of the IR image data 150 detected by that detector. The pixel value from each detector may be utilized to form a respective portion (e.g., pixel location(s), pixel coordinate(s)) of the first IR image. The pixel values may be read out by the readout circuit 115 and provided to the processing circuit 120 for processing. In some embodiments, the processing circuit 120 generates an output IR image for the first imaging mode based on the first IR image. For example, the processing pipeline 210 may receive the pixel values that form the first IR image from the readout circuit 115 and generate the output IR image based on the pixel values.

At block 510, the processing circuit 120 determines whether at least a threshold number of the pixel values generated by the IR image capture circuit 105 exceed a saturation threshold value. For example, the threshold number of pixel values may be 15% of the total number of pixel values and the saturation threshold value may be a digital count value of 13,930 (e.g., around 85% of the maximum digital count value representable using 14 bits). In this example, the processing circuit 120 determines whether at least 15% of the total number of pixel values have a digital count value that exceeds 13,930.

If the processing circuit 120 determines that less than the threshold number of pixel values generated by the IR image capture circuit 105 exceed the saturation threshold value, the processing circuit 120 maintains the IR imaging device 100 in the single mode state at block 515. In this regard, for example, the IR imaging device 100 may remain set in the first imaging mode. At block 520, the IR image capture circuit 105 captures a single infrared image using the first imaging mode. As indicated previously, the single infrared image may be captured by detecting IR image data and generating pixel values based on the detected IR image data. At block 525, the processing circuit 120 generates pixel values that form an output IR image (e.g., using the processing pipeline 210) based on the single infrared image and the first imaging mode. With reference to FIG. 2, the output IR image may bypass the combine logic 225 or may pass through the combine logic 225 (e.g., without further processing).

If the processing circuit 120 determines that at least the threshold number of pixel values exceeds the saturation threshold value, the processing circuit 120 transitions the IR imaging device 100 from the single mode state to the superframing state at block 530. With the IR imaging device 100 in the superframing state, at block 535, the IR image capture circuit 105 captures a second IR image (e.g., a first-mode image) using the first imaging mode and, at block 540, the IR image capture circuit 105 captures a third IR image (e.g., a second-mode image) using the second imaging mode. After the readout of the second IR image to the processing pipeline 210 is complete, a control signal(s) generated by the processing circuit 120 (e.g., using the switch logic 220) may cause the switch 205 to couple the readout circuit 115 to the processing pipeline 215 and allow readout of the third IR image to the processing pipeline 215.

At block 545, the processing circuit 120 generates an output IR image based on the second IR image and the third IR image. For example, the processing circuit 120 may include the combine logic 225 that generates the output IR image by combining the second IR image and the third IR image. The output IR image may be referred to as a combined IR image, superframe IR image, or IR superframe, since the output IR image is generated based on a combination of multiple IR images or portions thereof (e.g., a combination of IR images generated using different imaging modes). In some cases, the first imaging mode is associated with higher sensitivity but lower dynamic range than the second imaging mode. Thus, the combining of the second IR image and the third IR image into the output IR image extends the dynamic range of the IR imaging device 100 relative to a case in which the output IR image is generated strictly based on a first-mode image in the single mode state.

In one or more aspects, the processing circuit 120 (e.g., the combine logic 225 that forms part of the processing circuit 120) may determine portions (e.g., pixel locations, pixel coordinates) of the second IR image associated with pixel values that exceed the saturation threshold value (referred to as threshold-exceeding pixels), portions of the second IR image associated with pixel values that do not exceed the saturated threshold value (referred to as non-threshold-exceeding pixels), and portions of the third IR image and associated pixel values that correspond to the threshold-exceeding pixels of the second IR image. The processing circuit 120 may then generate the output IR image based on the non-threshold-exceeding pixels of the second IR image and the pixels of the third IR image that correspond to threshold-exceeding pixels of the second IR image.

In some embodiments, the IR imaging device 100 may utilize more than two imaging modes in the superframing state. In these embodiments, at block 535, the IR image capture circuit 105 may capture a second IR image (e.g., a first-mode image) using the first imaging mode and, at block 540, the IR image capture circuit 105 may capture each of at least one other IR image using a respective imaging mode different from the first imaging mode. At block 545, the processing circuit 120 may generate a combined IR image based on the second IR image and each of the at least one other IR image.

For example, the IR imaging device 100 may have available three imaging modes: the first imaging mode associated with the highest sensitivity (e.g., and lowest dynamic range), the second imaging mode associated with the lowest sensitivity (e.g., and highest dynamic range), and a third imaging mode associated with sensitivity (e.g., and dynamic range) between the first and second imaging modes. The first, second, and third imaging mode may be referred to as a high-gain mode, low-gain mode, and medium-gain mode, respectively. In these cases, one or more superframing states may be defined. For example, a first superframing state may involve generating a combined IR image based on a respective IR image generated from each of the first, second, and third imaging modes. As another example, a second superframing state may involve generating a combined IR image based on a respective IR image generated from each of the first and third imaging modes. The IR imaging device 100 may transition from the second superframing state to the first superframing state in a case that the IR image generated using the third imaging mode has at least a threshold number of pixel values that exceed a saturation threshold value (e.g., to further extend the dynamic range of the IR imaging device 100). In some aspects, rather than transitioning from a single mode state to a superframing state, or vice versa, the transition of the IR imaging device 100 may be from a single mode state (e.g., the first imaging mode) to another single mode state (e.g., the second imaging mode).

In one or more embodiments, decision logic for determining the imaging mode may be contained in the readout circuit 115 (e.g., rather than in off-chip electronics). In some cases, implementing the decision logic in the readout circuit 115 may facilitate selection of imaging modes on a per-pixel basis for each captured IR image at a time of readout. For example, the decision logic may compare a pixel value for a given pixel to a threshold value, select an imaging mode to utilize for a next pixel based on the comparison, and read out a pixel value for the next pixel using the selected imaging mode.

Implementing the decision logic in the readout circuit 115 may allow generation of a combined IR image that includes IR image information associated with multiple imaging modes at a faster frame rate (e.g., 60 Hz), since the combined IR image may be formed without acquiring complete IR images at each imaging mode and combining them into a single IR image (which reduces the frame rate). In some cases, the per-pixel decision made at the time of readout may allow output of IR frames from the IR imaging device 100 to be at or around the same output frame rate as a native frame rate of the readout circuit 115. For example, the IR image from the readout circuit 115 may be at, for example, 60 Hz rather than 30 Hz, even in a case that the IR image contains pixel values generated using multiple (e.g., two) imaging modes. Additionally, since the IR frame is not synthesized based on two separate IR images acquired at different points in time, issues such as motion within an image scene that occur between the different points in time, which can cause image artifacts, can be reduced or avoided.

An output stream of the readout circuit 115 may include a pixel value(s) and an indication (e.g., one or more bits) to downstream processing of the imaging mode utilized to capture the pixel value. The downstream processing may refer to any processing performed subsequent to readout, such as, for example, the processing performed by the processing pipeline 210 shown in FIG. 4, the processing performing by the blend logic 305 shown in FIG. 3, etc.

Figure 6:
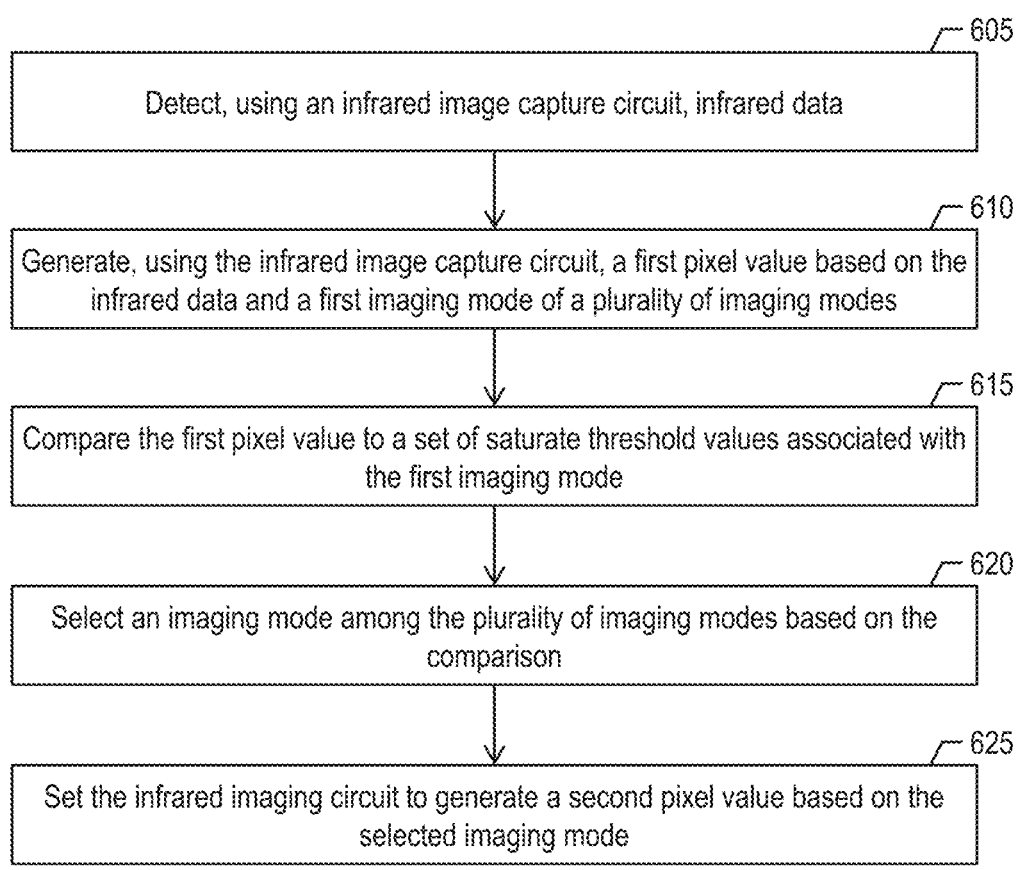

FIG. 6 illustrates a flow diagram of an example process 600 for facilitating IR imaging in multiple imaging modes in accordance with one or more embodiments of the present disclosure. For explanatory purposes, the example process 600 is primarily described herein with reference to the IR imaging device 100 of FIGS. 1-3; however, the example process 600 is not limited to the IR imaging device 100 of FIGS. 1-3.

At step 605, the IR image detector circuit 110 detects the IR image data 150 (e.g., IR radiation). At step 610, the IR image detector circuit 110 generates a first pixel value based on the IR image data 150 and the first imaging mode. In an aspect, the IR image detector circuit 110 and/or readout circuit 115 may generate an indication (e.g., a flag) associated with the first pixel value that indicates the first pixel value is generated based on the first imaging mode.

At step 615, the readout circuit 115 and/or the processing circuit 120 compares the first pixel value to a set of saturated threshold values associated with the first imaging mode. At step 620, the readout circuit 115 and/or the processing circuit 120 selects an imaging mode among available imaging modes based on the comparison performed at step 615. For example, based on the comparison, the readout circuit 115 may generate an indication (e.g., a flag) regarding whether a second pixel value is to be captured using the first imaging mode or the second imaging mode. In this regard, the IR imaging device 100 may be transitioned from one single mode state to another single mode state. At step 625, the readout circuit 115 and/or the processing circuit 120 sets the IR image capture circuit 105 to generate a second pixel value based on the selected imaging mode. In some embodiments, the readout circuit 115 may include decision logic for performing steps 615, 620, and 625. In these embodiments, by including the decision logic in the readout circuit 115, the readout circuit 115 may select an imaging mode in which to operate a pixel on a per-pixel basis for a given IR image at a time of readout of the IR image (e.g., to the processing circuit 120). In an aspect, the decision logic may be, or may be coupled to, the switch logic 220, and may generate and/or process the indication and/or configure the switch 205 based on the indication.

As an example, consider a case in which the IR imaging device 100 has two available imaging modes, a high-gain mode associated with higher sensitivity and a low-gain mode associated with higher dynamic mode, and detects the IR image data at step 605 and generates the first pixel value at step 610 using the high-gain mode. A high-to-low saturation threshold value is associated with the high-gain mode. A low-to-high saturation threshold value is associated with the low-gain mode. The high-to-low and low-to-high saturation threshold values may be referred to as transition threshold values. In such a case, at step 615, the readout circuit 115 and/or processing circuit 120 may compare the first pixel value to the high-to-low saturation threshold value associated with the high-gain mode. At step 620, the readout circuit 115 and/or processing circuit 120 may select the high-gain mode when the first pixel value is less than the high-to-low saturation threshold value and may select the low-gain mode when the first pixel value is at least the high-to-low saturation threshold value. At step 625, the readout circuit 115 and/or processing circuit 120 may appropriately set the IR imaging device 100. The second pixel value may be generated based on the imaging mode set for the IR imaging device 100 at step 625.

Consider that the IR image capture circuit 105 detects the IR image data 150 at step 605 and generates the first pixel value at step 610 using the low-gain mode. In such a case, at step 615, the readout circuit 115 and/or processing circuit 120 may compare the first pixel value to the low-to-high saturation threshold value associated with the low-gain mode. At step 620, the readout circuit 115 and/or processing circuit 120 may select the low-gain mode when the first pixel value is at least the low-to-high saturation threshold value and may select the high-gain mode when the first pixel value is less than the low-to-high saturation threshold value and, at step 625, appropriately set the IR imaging device 100. The second pixel value may be generated based on the imaging mode set for the IR imaging device 100 at step 625.

As another example, consider a case in which the IR imaging device 100 has three available imaging modes, a high-gain mode (e.g., highest sensitivity, lowest dynamic range), a low-gain mode (e.g., lowest sensitivity, highest dynamic range), and a middle-gain mode (e.g., medium sensitivity, medium dynamic range), and detects the IR image data 150 at step 605 and generates the first pixel value at step 610, respectively, using the high-gain mode. In such a case, at step 615, the readout circuit 115 and/or processing circuit 120 may compare the first pixel value to a high-to-medium saturation threshold value and a high-to-low saturation threshold value. Similarly, the low-gain mode and the middle-gain mode may each be associated with two respective transition threshold values.

In some embodiments, the output (e.g., pixel value) of a pixel p for an IR image f may determine an imaging mode to employ for a pixel in another image (e.g., an image f+1) and/or a pixel of the same IR image f. The IR images f and f+1 may refer to temporally adjacent images generated by the IR image detector circuit 110. In this regard, with reference to FIG. 6, the second pixel value at step 625 may be of a pixel in the same IR image as the first pixel, or may be a pixel in another IR image (e.g., a temporally adjacent IR image).

In some embodiments, based on the output of the pixel p for the IR image f, the decision logic may determine an imaging mode to be employed for a corresponding pixel p for the IR image f+1. In an aspect, the decision logic may be implemented on a per-pixel basis as part of the readout circuit 115, processing circuit 120, and/or in off-chip logic. The corresponding pixel p for the IR image f+1 may have the same pixel coordinates as the pixel p for the IR image f. In these embodiments, a latency may be introduced between a decision to switch an imaging mode associated with the pixel p for the IR image f and the time at which the decision goes into effect. In some cases, the latency may not be conducive in cases in which large, but transient, temperature changes pass through an instantaneous field of view (IFOV) of the IR image detector circuit 110. For example, if a pixel p is imaging a cold background and a hot object suddenly passes through its IFOV on the IR image f, the remaining pixels of the IR image f may remain in high-gain mode during the IR image f and their outputs may be saturated for the IR image f. If the object passes rapidly through the IFOV, then it may also be possible that the pixel p switches unnecessarily into the low-gain mode for the IR image f+1. In some cases, the latency may increase memory and/or circuitry utilized to store the decision for each pixel until a next image and effectuate the imaging mode transitions (as needed) at a later time.

In some embodiments, based on the output of the pixel p for the IR image f, the decision logic may determine an imaging mode to be employed for a pixel p+1 for the same IR image f. In these embodiments, a time gap present between the readout of pixel p and its neighbor, pixel p+1, may be utilized to allow a transition (if needed) in the imaging mode of the readout circuit 115 from an imaging mode employed for the pixel p to an imaging mode to be employed for the pixel p+1. In some aspects, the time gap associated with uncooled readout circuit (e.g., ROIC) architectures is sufficient to allow the transition.

For explanatory purposes, the array of detectors of the IR image detector circuit 110 may be composed of rows and columns. For example, in a readout circuit architecture that sequentially reads out each row of the array using one amplifier per column, the output of each pixel (e.g., detector) at row r and column c can be used to change characteristics (e.g., gain) of the amplifier for its neighbor pixel (e.g., neighbor detector) at a next row r+1 and same column c to effectuate a change in the imaging mode. However, the detectors of the IR image detector circuit 110 need not be arranged in rows and columns.

FIG. 7 illustrates an example of a rectangular array of detectors (e.g., 4×4 array of detector) and a pixel value and an imaging mode associated with each detector in accordance with one or more embodiments of the present disclosure. In FIG. 7, the readout circuit 115 reads the pixel values from the rectangular array of detectors one row at a time from top to bottom (i.e., starting from row 1). In this case, a pixel p+1 that neighbors a pixel p may be a pixel of the same column but at an adjacent row (e.g., in terms of readout by the readout circuit 115). Each pixel p may be associated with a pixel coordinate/location indicative of a row number and column number of the detector utilized to generate the pixel value of the pixel p. In FIG. 7, the pixel values are given in terms of counts (e.g., digital count values). However, in other cases, the pixel values can be given in other manners, such as electrical signals (e.g., voltages, currents), temperatures, and/or irradiance values, for example.

In FIG. 7, the high-gain mode is associated with a high-to-low saturation threshold value of 12,000 counts and the low-gain mode is associated with a low-to-high saturation threshold value of 4,000 counts. For a pixel value at a pixel p generated in the high-gain mode, the pixel value may be compared to the high-to-low saturation threshold value. When the pixel value does not exceed the high-to-low saturation threshold value, a next pixel value (e.g., for a neighboring pixel p+1) may be generated using the high-gain mode. When the pixel value exceeds the high-to-low saturation threshold value, the next pixel value may be generated using the low-gain mode.

For a pixel value at a pixel p generated in the low-gain mode, the pixel value may be compared to the low-to-high saturation threshold value. When the pixel value does not exceed the low-to-high saturation threshold value, a next pixel value (e.g., for a neighboring pixel p+1) may be generated using the high-gain mode. When the pixel value exceeds the low-to-high saturation threshold value, the next pixel value may be generated using the low-gain mode.

In FIG. 7, an example is shown in which a pixel value in a current IR image (e.g., IR image f) may determine which imaging mode to use to generate a neighboring pixel value in the same IR image. A hot object 705 encroaches into the pixels (e.g., IR detectors) at (column 2, row 1) and (column 3, row 1) and causes the pixel values (e.g., 13,000 counts) at these pixels, which are captured using high-gain mode, to be above the high-to-low threshold of 12,000 counts. Since the pixel value at (column 2, row 1) exceeds the high-to-low threshold of 12,000, the pixel value at (column 2, row 1) causes the neighboring pixel at a next row (column 2, row 2) to be operated in the low-gain mode. Similarly, since the pixel value at (column 3, row 1) exceeds the high-to-low threshold of 12,000, the pixel value at (column 3, row 1) causes the neighboring pixel at (column 3, row 2) to be operated in low-gain mode.

The pixel value at (column 2, row 2) and (column 3, row 2) are captured in the low-gain mode and are at 6,000 counts. Since the pixel value (column 2, row 2) and (column 3, row 2) exceed the low-to-high saturation threshold value, the pixels at (column 2, row 3) and (column 3, row 3) are operated in the low-gain mode. The pixel value at (column 2, row 3) and (column 3, row 3) are below the low-to-high threshold, such that their neighbor pixels at (column 2, row 4) and (column 3, row 4), respectively, are operated in high-gain mode.

In FIG. 7, the imaging mode is set for each pixel one row at a time in accordance with the readout order of the readout circuit 115. The pixel value of a pixel in the first row at a column c is utilized to determine the imaging mode of a pixel in the second row at the same column c. In some cases, the first pixel(s) (e.g., the first row of pixels) are operated in the high-gain mode by default. In other cases, the first pixel(s) may be operated based on the pixel values generated by the first pixel(s) in a previous IR image and the imaging mode utilized to generate these pixel values.

With reference for example to FIG. 7, the utilization of the high-to-low and low-to-high threshold values may be based on spatial relationships between pixels. For example, in a case that a pixel p is saturated (or nearly saturated), it is likely that its neighbors (e.g., along horizontal and/or vertical directions) are also saturated (or nearly saturated). Such a spatial relationship is generally applicable when imaging large hot objects, and in some cases may also be applicable for imaging small hot objects. With many IR imaging devices, such as uncooled IR imaging devices (e.g., uncooled IR cameras), optical blur may prevent a hot point source from being imaged entirely onto a single pixel. That is, every hot object, even small ones, may have a periphery that is non-saturating yet sufficiently high to affect operation for neighboring pixels, as exemplified in FIG. 7.

In some embodiments, the high-to-low saturation threshold value and the low-to-high saturation threshold value may be associated with different temperatures. The high-to-low saturation threshold value may be set to a digital count value indicative of a temperature different from a temperature associated with the low-to-high saturation threshold value. For example, with reference to FIG. 7, the high-to-low saturation threshold value of 12,000 counts may be associated with a temperature of 150° C. and the low-to-high saturation threshold value of 4,000 counts may be associated with a temperature of 140° C. In some cases, the difference in temperatures in transitioning to or from the high-gain mode and the low-gain mode may help avoid oscillation of the IR imaging device 100 back and forth between the high-gain mode and low-gain mode (e.g., due to small temperature changes detected by a given pixel). For example, such an oscillation may adversely affect quality of generated IR images (or IR image video sequence) and user experience. The difference in the temperatures associated with the imaging mode transitions may be referred to as a hysteresis effect. Furthermore, the same count value may be indicative of different temperatures when detected in different imaging modes. For example, for a first imaging mode (e.g., high-gain mode), a count value of 12,000 for a pixel may be indicative of a temperature of 150° C. for a location imaged by that pixel. In contrast, for a second imaging mode (e.g., low-gain mode), a count value of 12,000 for a pixel may be indicative of a temperature of 450° C. for a location imaged by that pixel.

The high-gain mode may be associated with a higher responsivity than the low-gain mode. For example, in a case that the high-gain mode has a responsivity of four times that of low-gain mode, the responsivity ratio (also referred to as response ratio) is 4. With reference to such an example, in the high-gain mode, a 20° C. background may produce a pixel output value of 8,000 counts and a 150° C. target (e.g., object) may produce a pixel value of 13,000 counts. Then in the low-gain mode, the expected difference between the 20° C. background and the 150° C. target is 1,250 counts (5,000/4). In this regard, if temperature were linear with irradiance, the low-gain mode may have four times the temperature range compared to the high-gain mode. In an aspect, since irradiance is generally a non-linear function of scene temperature, with the derivative dI/dT (where I is irradiance and T is temperature), the low-gain mode may have an irradiance range slightly different from (e.g., slightly less than) four times that of the high-gain mode.

The noise in the low-gain mode is generally higher than the inverse of the response ratio. In this regard, the SNR of low-gain mode is generally worse than high-gain mode. For example, noise in the low-gain mode may only be half that of the high-gain mode while responsivity is a fourth of the high-gain mode. In this example, the SNR in the low-gain mode may be half that of the high-gain mode, since the signal is decreased by four times while the noise is decreased by two times. Thus, in an aspect, the single mode state may utilize the high-gain mode (e.g., rather than the low-gain mode) to make use of the higher SNR generally associated with the high-gain mode. The switch from the single mode state to the superframing state may be effected to allow extended dynamic range when appropriate.

Figure 8:
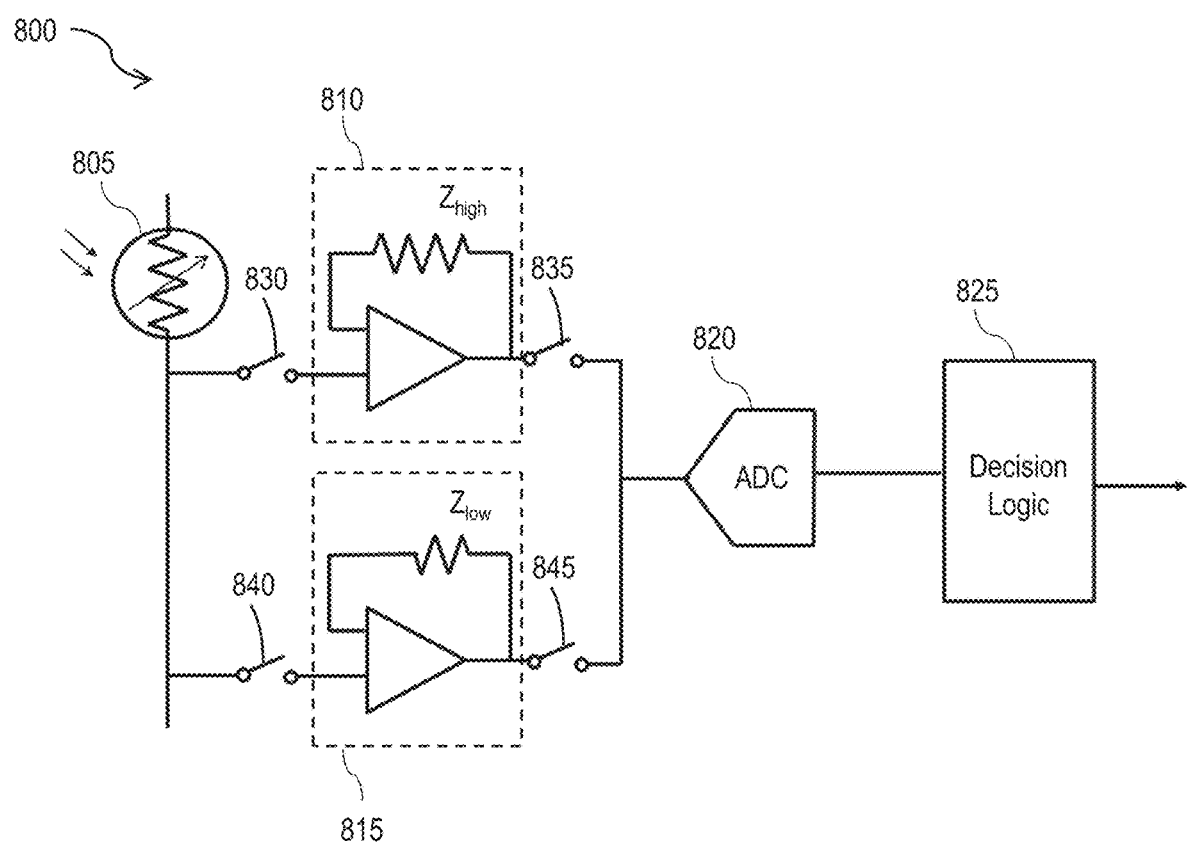
FIGS. 8 through 11 illustrate example circuit arrangements for facilitating IR imaging in multiple imaging modes in accordance to one or more embodiments of the present disclosure.

FIG. 8 illustrates an example circuit arrangement 800 for facilitating IR imaging in multiple imaging modes in accordance to one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The circuit arrangement 800 includes an IR detector 805, amplifier arrangements 810 and 815, an ADC circuit 820, decision logic 825, and switches 830, 835, 840, and 845. As an example, in FIG. 8, the IR detector 805 is represented as a radiation-sensitive variable resistor. In this example, the radiation-sensitive variable resistor may be, or may be a part of, a microbolometer.

In some aspects, the circuit arrangement 800 may be part of the IR image capture circuit 105 of FIG. 1. For example, the IR detector 805 and the amplifier arrangements 810 and 815 may be utilized by the IR image detector circuit 110 to detect IR radiation and generate a pixel value based on the IR radiation detected by the IR detector 805. In some cases, the switches 830, 835, 840, and 845 may be representative of the timing associated with the readout of the IR detector 805 by the readout circuit 115. In some cases, the decision logic 825 may be part of the readout circuit 115, such as to facilitate selection of imaging modes on a per-pixel basis.

The amplifier arrangement 810 includes an amplifier and a feedback impedance $Z_{high}$. The amplifier arrangement 815 includes an amplifier and a feedback impedance $Z_{low}$. In some cases, the amplifier arrangements 810 and 815 may be utilized for the first imaging mode (e.g., HG mode) and second imaging mode (e.g., LG mode), respectively. The amplifier characteristics (e.g., gain, input impedance, output impedance) and/or feedback impedance of the amplifier arrangements 810 and 815 may be configured differently for different imaging modes. For example, the gain of the amplifier in the amplifier arrangement 810 may be different from the gain of the amplifier in the amplifier arrangement 815, and/or the feedback impedance $Z_{high}$ may be different from the feedback impedance $Z_{low}$. Although FIG. 8 is associated with two imaging modes, the circuit arrangement 800 may be extended to allow for additional imaging modes (e.g., such as using additional amplifier arrangements).

When the switches 830 and 835 are in a closed state (e.g., on state), the amplifier arrangement 810 receives an output of the IR detector 805, generates an electrical signal (e.g., voltage, current) based on the output of the IR detector 805, and provides the electrical signal to the ADC circuit 820 (e.g., for conversion into a digital count value). When the switches 830 and 835 are in an open state (e.g., off state), the amplifier arrangement 810 is isolated from the remaining components shown in FIG. 8. Similarly, when the switches 840 and 845 are in a closed state, the amplifier arrangement 815 receives an output of the IR detector 805, generates an electrical signal based on the output of the IR detector 805, and provides the electrical signal to the ADC circuit 820. When the switches 840 and 845 are in an open state, the amplifier arrangement 815 is isolated from the remaining components shown in FIG. 8. In some cases, the state (e.g., closed or open state) of the switches 830, 835, 840, and 845 may also be set in accordance with a readout time associated with the imaging modes.

The decision logic 825 may determine an imaging mode to be utilized for a next pixel based on an output (e.g., digital count value) of the ADC circuit 820 associated with a current pixel. As discussed, for example, with respect to FIGS. 6 and 7, the decision logic 825 may compare the digital count value associated with the current pixel to a transition threshold value(s) associated with the imaging mode utilized for the current pixel. For example, when the current pixel is captured using the high-gain mode and the digital count value associated with the current pixel is above a transition threshold (e.g., high-to-low saturation threshold value), the decision logic 825 may select the low-gain mode for the next pixel. The next pixel may be in the same IR image as the current pixel or may be in another IR image (e.g., a temporally adjacent IR image subsequent to the IR image that contains the current pixel).

In some aspects, the decision logic 825 may be, may include, or may be part of the switch logic 225 shown in FIG. 2. In some aspects, the decision logic 825 and/or the switch logic 225 may be part of the readout circuit 115. In these aspects, while the decision logic 825 may be implemented in a digital portion of the readout circuit 115, the decision logic 825 may also be implemented in an analog domain (e.g., based on an output of the amplifier arrangement 810 or 815 without an intervening ADC circuit).

In some cases, the decision logic 825 may generate a signal(s) (e.g., voltage signals) that configures the switches 830, 835, 840, and 845. Alternatively or in addition, the decision logic 825 may generate a signal(s) that indicates to which imaging mode to transition the IR imaging device 100 and provide the signal(s) to a circuit (e.g., the switch logic 225) to generate a control signal(s) to configure the switches 830, 835, 840, and 845. In some cases, the ADC circuit 820 and/or the decision logic 825 may be shared by different pixels (e.g., in a time-multiplexed manner). In these cases, outputs from different pixels can be provided to the ADC circuit 820 and/or the decision logic 825, and the decision logic 825 may generate a signal(s) for setting the imaging mode for each pixel value received (e.g., from the pixels and/or from the ADC circuit 820). An output stream of the readout circuit 115 may include a pixel value(s) and an indication (e.g., one or more bits) to downstream processing of the imaging mode utilized to capture the pixel value.

Figure 9:
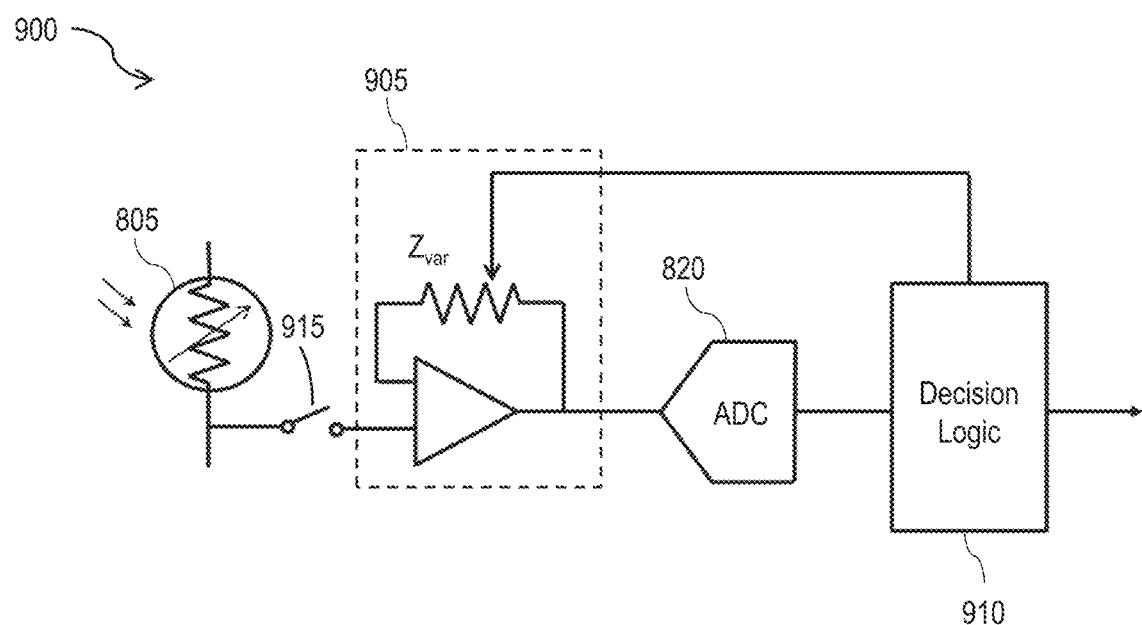

FIG. 9 illustrates an example circuit arrangement 900 for facilitating IR imaging in multiple imaging modes in accordance to one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. The description from FIG. 8 generally applies to FIG. 9, with examples of differences between FIG. 8 and FIG. 9 and other description provided herein for purposes of clarity and simplicity. By using a fewer number of amplifier arrangements (e.g., one in FIG. 9 compared to two in FIG. 8), chip real estate can be conserved and/or power consumption can be reduced.

The circuit arrangement 900 includes the IR detector 805, an amplifier arrangement 905, the ADC circuit 820, decision logic 910, and a switch 915. The amplifier arrangement 905 includes an amplifier and a variable feedback impedance $Z_{var}$. Characteristics of the amplifier arrangement 905 may be tuned to effectuate different imaging modes. For example, an impedance value of the variable feedback impedance $Z_{var}$ may be tuned to effectuate different effective gains for the amplifier arrangement 905 and, accordingly, effectuate different imaging modes. In some cases, the amplifier may include components that may be tuned independent of tuning the variable feedback impedance $Z_{var}$.

In FIG. 9, the decision logic 910 may be utilized to switch the amplifier arrangement 905 from operating in one imaging mode to operating in another imaging mode based on an output of the amplifier arrangement 905. The decision logic 910 may compare the output of the ADC circuit 820 associated with a pixel to a transition threshold value(s) associated with an imaging mode utilized to capture the pixel value for the pixel. For example, if the pixel is currently operating in the high-gain mode, the decision to switch to the low-gain mode may occur if the pixel output exceeds a transition threshold value (e.g., the high-to-low saturation threshold value). If the pixel is currently operating in the low-gain mode, the decision to switch to the high-gain mode may occur if the pixel output falls below a different transition threshold value (e.g., the low-to-high saturation threshold value). Similar to the decision logic 825 of FIG. 8, while the decision logic 910 may be implemented in a digital portion of the readout circuit 115, the decision logic 910 may also be implemented in an analog domain (e.g., based on an output of the amplifier arrangement 905 without an intervening ADC circuit). In some cases, the decision logic 910 may generate a signal(s) (e.g., voltage signals) that configures the switch 915 to couple a detection signal (e.g., current signal) from the IR detector 805 to the amplifier arrangement 905. Timing associated with capture of IR image data and associated readout may be effectuated through use of such control signal(s). In other cases, an on or off state of the switch 915 may be controlled by other control circuitry (e.g., provided by the IR image detector circuit 110 and/or readout circuit 115).

In one or more embodiments, values associated with different imaging modes may be captured during a single frame. In an aspect, a decision may be made on an ROIC (e.g., the readout circuit 115) so that either a first imaging mode pixel value (e.g., high-gain mode pixel value) or a second imaging mode pixel value (e.g., low-gain mode pixel value) is read out. In some cases, such a pixel value may be read out along with a bit or bits indicating (e.g., to downstream processing) whether the pixel value is associated with the first imaging mode or the second imaging mode. In an aspect, pixels remain unsaturated while also maintaining a maximum gain (e.g., and thus minimum noise equivalent differential temperature (NEDT)) for those pixels that do not saturate. In addition, by capturing different imaging modes during a single frame, a higher frame rate (e.g., 60 Hz) may be maintained relative to a case in which two imaging modes are taken (e.g., 30 Hz frame rate with one image taken for first imaging mode and one image taken for second imaging mode).

Figure 10:
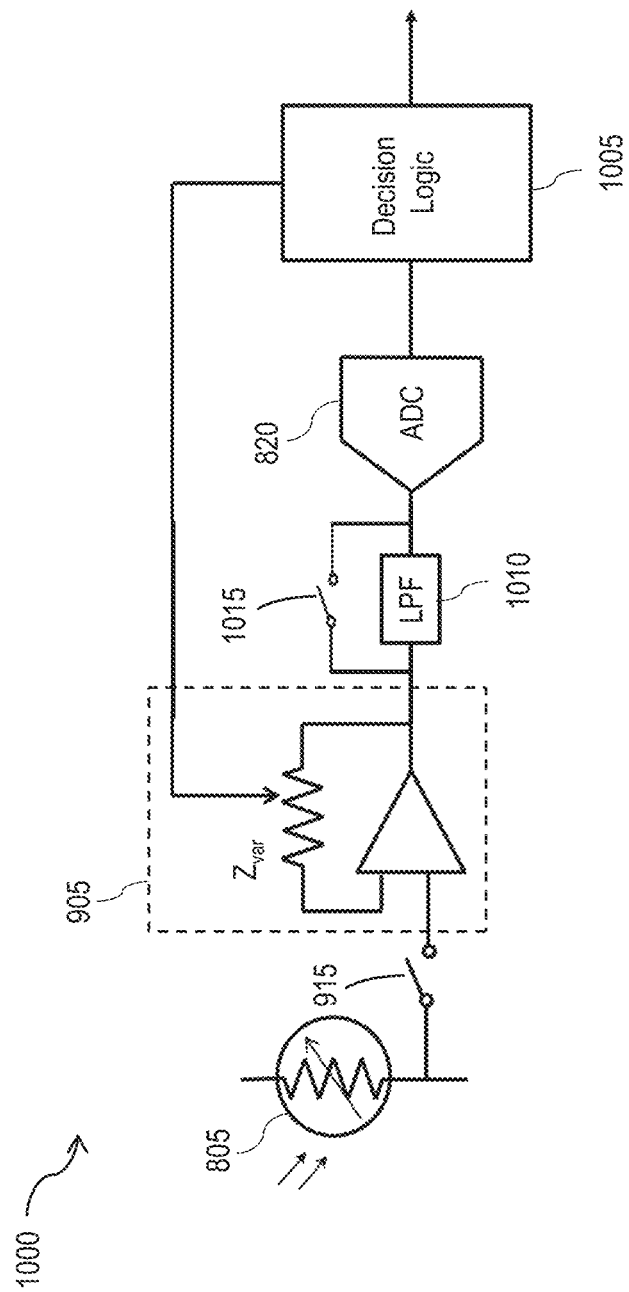

FIG. 10 illustrates an example circuit arrangement 1000 for facilitating IR imaging in multiple imaging modes in accordance to one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. The description of FIG. 9 generally applies to FIG. 10, with examples of differences and other description provided herein for purposes of clarity and simplicity.

The circuit arrangement 1000 includes the IR detector 805, the amplifier arrangement 905, the ADC circuit 820, the switch 915, decision logic 1005, a low-pass filter (LPF) 1010, and a switch 1015. Characteristics of the amplifier arrangement 905 may be tuned to effectuate different imaging modes. The decision logic 1005 may be utilized to switch the amplifier arrangement 905 from operating in one imaging mode to operating in another imaging mode based on an output of the amplifier arrangement 905. For example, in FIG. 10, the decision logic 1005 may cause transition from one imaging mode to another imaging mode by tuning the variable feedback impedance $Z_{var}$ of the amplifier arrangement 905. When the switch 1015 is open (e.g., in an off state), the LPF 1010 may be utilized to reduce noise from the output of the amplifier arrangement 905. When the switch 1015 is closed (e.g., in an on state), the LPF 1010 is shorted out and the output of the amplifier arrangement 905 is not filtered by the LPF 1010 (e.g., the output is routed directly to the ADC circuit 820). As such, the switch 1015 may be utilized to selectively short out the LPF 1010. The LPF 1010 may be referred to as being turned on when the switch 1015 is open and turned off when the switch 1015 is closed. Although FIG. 10 (and subsequent figures) uses the switch 1015 to effectively turn on or off the LPF 1010, other manners by which to turn on or off the LPF 1010 may be utilized alternatively or in addition.

In an embodiment, in operating the circuit arrangement 1000, the decision logic 1005 may close the switch 1015 to short out the LPF 1010 and set the variable feedback impedance $Z_{var}$ as appropriate to effectuate a higher gain mode (e.g., HG mode). If a digital count value of the output of the amplifier arrangement 905 provided by the ADC circuit 820 exceeds a transition threshold value (e.g., a high-to-low saturation threshold value), the decision logic

1005 may set the variable feedback impedance $Z_{var}$ as appropriate to cause transition from the higher gain mode to a lower gain mode.

In some cases, after a predetermined amount of time $T_1$ (e.g., user and/or manufacturer specified amount of time), the decision logic 1005 maintains the imaging mode effectuated at $t=T_1$ and the switch 1015 is opened to allow filtering of the output of the amplifier arrangement 905 by the LPF 1010. For example, if the higher gain mode is effectuated at $t=T_1$ (e.g., the output of the ADC circuit 820 does not exceed the transition threshold value by $t=T_1$), the decision logic 1005 maintains operation of the circuit arrangement 1000 in the higher gain mode for $t>T_1$. If the lower gain mode is effectuated at $t=T_1$ (e.g., a transition from the higher gain mode to the lower gain mode occurred before $t=T_1$), the decision logic 1005 maintains operation of the circuit arrangement 1000 in the lower gain mode for $t>T_1$.

In an embodiment, the predetermined amount of time $T_1$ may be a percentage of a total line time $T_{line}$. For example, the predetermined amount of time $T_1$ may be set to be around 20% of the total line time (e.g., $T_1=0.20T_{line}$). In an aspect, the total line time is the time that an active detector (e.g., an active bolometer), such as the IR detector 805, is biased for. In cases that an entire row of detectors (e.g., bolometers) are biased together, the total line time may be a total frame time divided by the number of lines. For example, when the frame rate is 60 Hz with 256 rows, the line time is (1/60) Hz/256 lines 65 μs/line.

Prior to the predetermined amount of time $T_1$, with the LPF 1010 effectively turned off (e.g., by turning on the switch 1015), the output from the amplifier arrangement 905 generally moves quickly to approximate its final value, thus allowing an imaging mode decision to be made before filtering is performed. The switch 1015 may be controlled by the decision logic 1005 and/or other control circuitry that provides control signals with appropriate timing. After the predetermined amount of time $T_1$, the LPF 1010 is effectively turned on (e.g., by turning off the switch 1015) to allow filtering of the output associated with the imaging mode selected by the decision logic 1005 to reduce noise. For example, the LPF 1010 may limit a noise bandwidth of the output of the amplifier arrangement 905 by filtering out high frequency noise components.

The output of the amplifier arrangement 905 in the selected imaging mode may be digitized by the ADC 820. The decision logic 1005 may generate one or more bits to indicate the selected imaging mode associated with the output of the amplifier arrangement 905. In this regard, the decision logic 1005 may provide digitized pixel values (e.g., digitized representations of outputs of the amplifier arrangement 905) together with one or more associated bits for each digitized pixel value to provide an indication to downstream processing (e.g., performed by the processing pipeline 210 or 215) of the selected imaging mode for the digitized pixel value. In a case with two imaging modes (e.g., high-gain and low-gain modes), the indication of the selected imaging mode may be a single bit to indicate if the associated sample (e.g., digital value) is taken in the first imaging mode or second imaging mode. By selectively switching between imaging modes within a single frame (e.g., within the total line time), small signals may be sampled in a higher gain mode and large signals may be sampled in a lower gain mode within the single frame.

Figure 11:
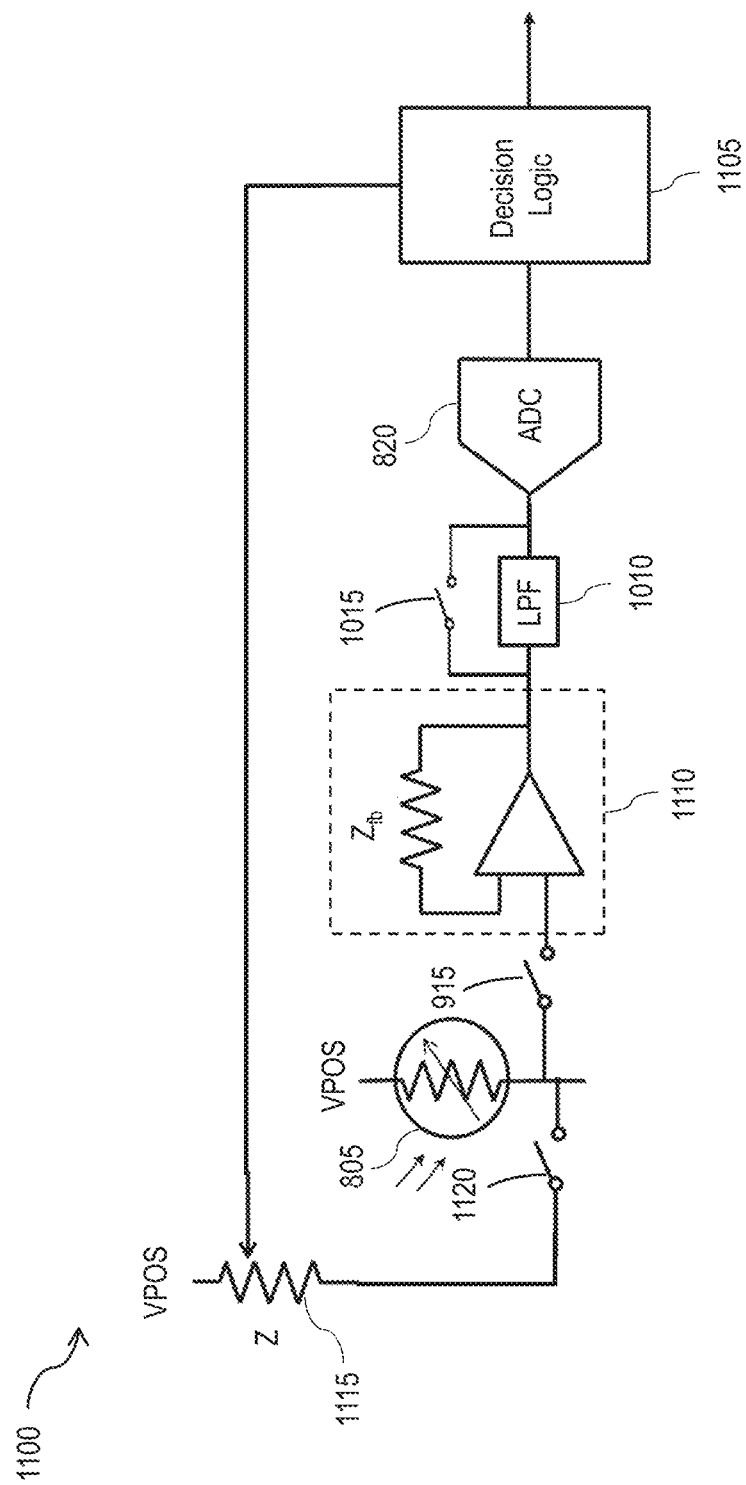

FIG. 11 illustrates an example circuit arrangement 1100 for facilitating IR imaging in multiple imaging modes in accordance to one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. The description of FIG. 10 generally applies to FIG. 11, with examples of differences and other description provided herein for purposes of clarity and simplicity.

The circuit arrangement 1100 includes the IR detector 805, the ADC circuit 820, the switch 915, the LPF 1010, the switch 1015, a decision logic 1105, an amplifier arrangement 1110, a variable impedance Z 1115, and a switch 1120. The amplifier arrangement 1110 includes an amplifier and a feedback impedance $Z_{fb}$. An impedance value of the variable impedance 1115 may be tuned to effectuate different effective gains for the circuit arrangement 1100 and, accordingly, effectuate different imaging modes.

The variable impedance 1115 may be selectively coupled to the IR detector 805 via the switch 1120. For example, one or more of the imaging modes may be effectuated by coupling the variable impedance 1115 to the IR detector 805 by closing the switch 1120, whereas one or more of the other imaging modes may be effectuated by decoupling the variable impedance 1115 from the IR detector 805 by opening the switch 1120. Although the variable impedance 1115 is depicted as a single resistor, the variable impedance 1115 may include multiple resistive elements and/or reactive elements. As one example, the variable impedance 1115 may include one or more resistors in parallel with the IR detector 805. As another example, the impedance 1115 may include one or more resistors in parallel with the IR detector 805 and one or more resistors in series with the IR detector 805. In some cases, one or more of these resistive and/or reactive elements of the variable impedance 1115 may be tunable to effectuate different imaging modes.

The decision logic 1105 may be utilized to switch the circuit arrangement 1100 from operating in one imaging mode to operating in another imaging mode based on an output of the amplifier arrangement 905. The decision logic 1105 may cause transition from one imaging mode to another imaging mode by tuning the variable impedance 1115 and/or selectively coupling the variable impedance 1115 to the IR detector 805. The switch 1015 may be utilized to selectively short out the LPF 1010. In some aspects, the operation of the circuit arrangement 1100 is similar to the operation of the circuit arrangement 1000, except that different imaging modes are effectuated by controlling the variable impedance 1115 and/or the switch 1120 in the circuit arrangement 1100.

Although FIG. 11 illustrates an example in which the decision logic 1105 can selectively effectuate different imaging modes by tuning the variable impedance 1115 and/or selectively coupling the variable impedance 1115 to the IR detector 805 via the switch 1120, alternatively or in addition, the decision logic 1105 can selectively effectuate different imaging modes in other manners. In some cases, the circuit arrangement 1100 may include components that may be tuned (e.g., by the decision logic 1105) alternative or in addition to tuning the variable impedance 1115, such as implementing the feedback impedance $Z_{fb}$ as a variable feedback impedance as previously shown in FIG. 10. In these cases, the amplifier characteristics (e.g., gain, input impedance, output impedance) of the amplifier arrangement 905, variable impedance 1115, and/or feedback impedance $Z_{fb}$ may be configured differently for different imaging modes.

Figure 12:
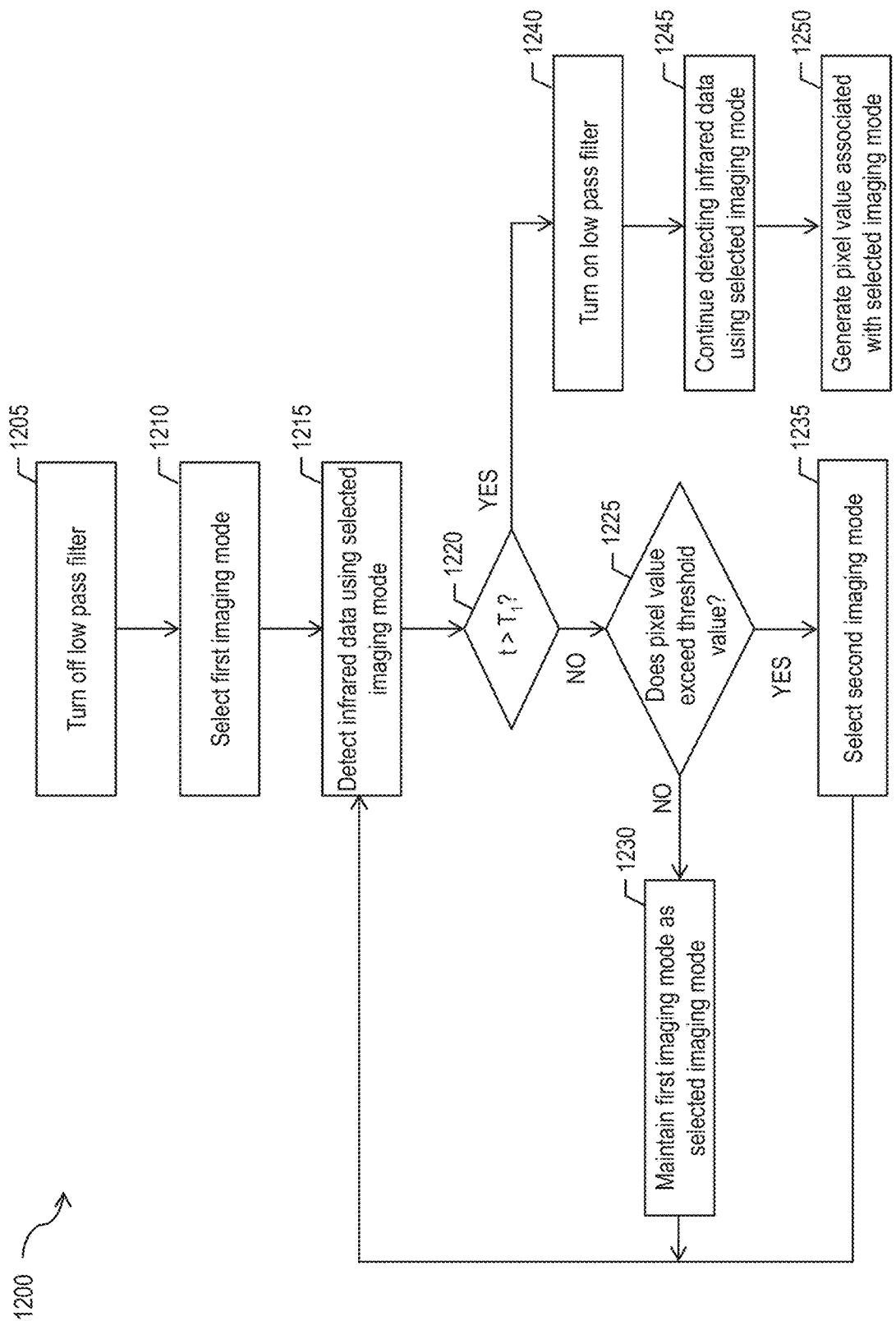
FIG. 12 illustrates a flow diagram of an example process for facilitating IR imaging in multiple imaging modes in accordance with one or more embodiments of the present disclosure.

FIG. 12 illustrates a flow diagram of an example process 1200 for facilitating IR imaging in multiple imaging modes in accordance with one or more embodiments of the present disclosure. For explanatory purposes, the example process 1200 is primarily described herein with reference to the circuit arrangements 1000 and 1100 of FIGS. 10 and 11, respectively; however, the example process 1200 is not limited to the circuit arrangements 1000 and 1100. Note that one or more operations may be combined, omitted, and/or performed in a different order as desired. In one or more embodiments, the blocks of FIG. 12 may be performed for each pixel of an IR image captured by the IR image capture circuit 105.

At block 1205, the LPF 1010 is turned off. The LPF 1010 may be turned off by turning the switch 1015 on (e.g., set the switch 1015 in a closed state), such as through use of a control signal from the decision logic (e.g., 1005, 1105) and/or other control circuitry. At block 1210, the decision logic selects a first imaging mode (e.g., high-gain mode). The decision logic may cause operation in the first imaging mode by adjusting a gain associated with the circuit arrangement (e.g., 1000, 1100). For example, the decision logic may adjust a gain provided by the circuit arrangement by adjusting the impedance $Z_{var}$ and/or the impedance Z 1115. At block 1215, the IR image detector circuit 110 detects infrared data using the selected imaging mode (e.g., high-gain mode as selected at block 1210). The infrared data is based on infrared radiation captured using the IR detector 805.

At block 1220, a determination is made as to whether a predetermined amount of time $T_1$ has elapsed. As an example, the predetermined amount of time may be a percentage of a total line time, such as around 20% of the total line time. When the predetermined amount of time has not elapsed, the process 1200 proceeds from block 1220 to block 1225. At block 1225, a determination is made whether a pixel value based on the detected infrared data exceeds a transition threshold value. The pixel value may be generated using the ADC circuit 820. When the pixel value does not exceed the transition threshold value, the process 1200 proceeds from block 1225 to block 1230. At block 1230, the decision logic maintains the first imaging mode as the selected imaging mode. The process proceeds to block 1215, in which the IR image detector circuit 110 continues to detect infrared data using the first imaging mode. When the pixel value exceeds the saturation threshold value, the process 1200 proceeds from block 1225 to the block 1235. At block 1235, the decision logic selects a second imaging mode. The process proceeds to block 1215, in which the IR image detector circuit 110 detects infrared data using the second imaging mode.

When the predetermined amount of time has elapsed, the process 1200 proceeds from block 1220 to block 1240. In this regard, once the predetermined amount of time has elapsed, the decision logic is no longer able to change the imaging mode. At block 1240, the LPF 1010 is turned on. For example, the LPF 1010 may be turned off from time $t=T_0=0$ to time $t=T_1$, and turned on at or after $t=T_1$. In this example, the time $t=T_0=0$ may be a predetermined time that identifies an initial time at which infrared data is beginning to be detected at block 1215. In some cases, $t=0^+$ (e.g., time right after time designated as zero) may be a time at which active detectors (e.g., the IR detector 805) begins to be biased. A predetermined time $t=T_2$ may be set as the time that the LPF 1010 is turned on. In some cases, $T_2=T_1^+$ or later. In some cases, $T_2$ may be set later than $T_1$ to allow some delay before turning on the LPF 1010 even in the case the imaging mode changes at or near the time $t=T_1$. As an example, the LPF 1010 may be turned on at around 15% of the total line time after $T_1$ (e.g., $T_1=0.20T_{line}$ and $T_2=0.35T_{line}$). In other cases, the delay is not used so that $T_2=T_1^+$ (e.g., time right after $T_1$), in which case the LPF 1010 may be turned on at the last moment $t=T_1$ that the decision logic (e.g., 1005, 1105) can adjust the imaging mode. As indicated previously, the IR image capture circuit 105 may include and/or may be coupled to control circuitry (e.g., clock circuitry) that provides appropriate control signals at appropriate times to operation in accordance with the predetermined times $T_0$, $T_1$, and $T_2$.

At block 1245, the IR image detector circuit 110 detects infrared data using the selected imaging mode (e.g., high-gain mode or low-gain mode). At block 1250, the ADC circuit 820 generates a pixel value associated with the selected imaging mode. In an aspect, the pixel value may be referred to as an output pixel value of the circuit arrangement. In some cases, the decision logic may pass the output pixel value along with a bit (or bits) indicative of the selected imaging mode to facilitate routing to and/or processing by a processing pipeline associated with the selected imaging mode. In this regard, the output pixel value from the ADC circuit 820 may be provided to an appropriate processing pipeline (e.g., processing pipeline 210 or 215) based on the selected imaging mode, such as prior to display and/or storage. Alternatively or in addition, the output pixel value from the ADC circuit 820 may be mapped using a palette associated with the selected imaging mode for facilitating display. In some cases, the palette may be applied to an output pixel value subsequent to processing by an appropriate processing pipeline.

In some embodiments, the process 1200 may facilitate selection between the high-gain mode (e.g., first imaging mode) and the low-gain mode (e.g., second imaging mode). Such selection may allow small signals (e.g., signals more distant from being saturated) in high-gain mode (e.g., for higher sensitivity) and large signals to be sampled in low-gain mode (e.g., for higher dynamic range). Although the process 1200 is described with reference to two imaging modes, in other embodiments more than two imaging modes may be utilized.

Figure 13:
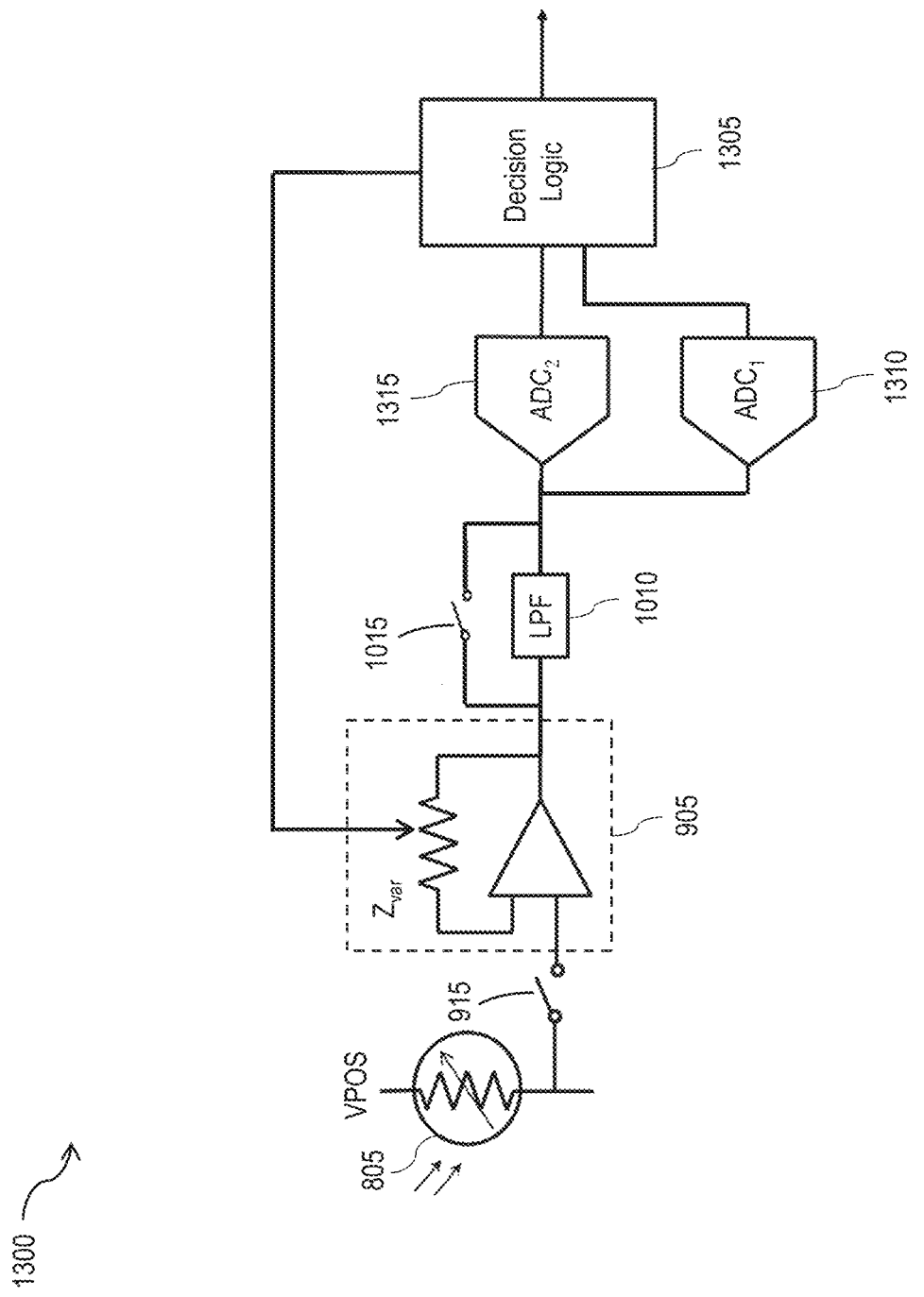
FIG. 13 illustrates an example circuit arrangement for facilitating IR imaging in multiple imaging modes in accordance to one or more embodiments of the present disclosure.

FIG. 13 illustrates an example circuit arrangement 1300 for facilitating IR imaging in multiple imaging modes in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. The description of FIG. 10 generally applies to FIG. 13, with examples of differences and other description provided herein for purposes of clarity and simplicity.

The circuit arrangement 1300 includes the IR detector 805, the amplifier arrangement 905, the switch 915, the LPF 1010, the switch 1015, a decision logic 1305, an ADC circuit 1310, and an ADC circuit 1315. The amplifier arrangement 905 includes an amplifier and a variable feedback impedance $Z_{var}$. An impedance value of the variable feedback impedance $Z_{var}$ may be tuned to effectuate different effective gains for the amplifier arrangement 905 and, accordingly, effectuate different imaging modes. In some cases, the amplifier arrangement 905 may include components that may be tuned alternative or in addition to tuning the variable feedback impedance $Z_{var}$.

In some aspects, in operating the circuit arrangement 1300, the decision logic 1305 may cause the circuit arrangement 1300 to operate in a lower gain mode (e.g., LG mode) and close the switch 1015 to short out the LPF 1010. For example, the decision logic 1305 may set the variable feedback impedance $Z_{var}$ as appropriate to effectuate the lower gain mode. An output of the amplifier arrangement 905 in the lower gain mode may be sampled after a predetermined amount of time $T_1$. For example, the predetermined amount of time $T_1$ may be set to be between around 10% to around 20% of the total line time (e.g., $T_1$ may be between $0.10T_{line}$ to $0.20T_{line}$). In an aspect, since the sample is not filtered by the LPF 1010 (e.g., the LPF 1010 is shorted out), the output of the amplifier arrangement 905 may have high noise. As the sample is captured in the lower gain mode, large signals from the IR detector 805 are generally not saturated. In some cases, higher noise is generally more acceptable for higher signals (e.g., signals with higher magnitude).

After sampling the output in the lower gain mode, the decision logic 1305 may cause transitioning of operation of the circuit arrangement 1300 from the lower gain mode to a higher gain mode (e.g., HG mode) and allow the output of the amplifier arrangement 905 to move to a new output level before turning on the LPF 1010. In some cases, the LPF 1010 may be turned on at a predetermined amount of time $T_2$. For example, the predetermined amount of time $T_2$ may be set to be between around 20% to around 40% of the total line time (e.g., $T_2$ may be between $0.20T_{line}$ to $0.40T_{line}$). In this regard, the LPF 1010 may be turned off from a predetermined time $t=T_0=0$ to the predetermined time $T_2$. The LPF 1010 may continue to filter the signal output from the amplifier arrangement 905 and sample the signal at the end of the total line time $T_{line}$. In some cases, sampling the signal at the end of the total line time may maximize noise reduction through filtering.

The ADC circuit 1310 may digitize the lower gain mode sample captured at $T_1$ (e.g., the digitization may be performed sometime after $T_1$). The ADC circuit 1315 may digitize the higher gain mode sample captured at the end of the total line time (e.g., the digitization may be performed sometime after $t=T_{line}$). The decision logic 1305 may select one of the lower gain mode sample or the higher gain mode sample. In an aspect, the decision logic 1305 may select the lower gain mode sample when the higher gain mode sample has a value above a threshold value (e.g., a saturation threshold value). Otherwise, the decision logic 1305 may select the higher gain mode sample when the higher gain mode sample when the higher gain mode sample does not have a value above the threshold value. For example, the threshold value may be 14,746 (e.g., around 90% of the 16,384 maximum count value for 14 bits), and the decision logic 1305 may select the lower gain mode sample when the higher gain mode sample is at or above 14,746 (e.g., from 14,746 to 16,384) and may select the higher gain mode sample when the higher gain mode sample is below 14,746 (e.g., from 0 to 14,745). The decision logic 1305 may generate one or more bits indicative of the imaging mode associated with the selected sample. In the above example with two imaging modes, the decision logic 1305 may generate a bit of value 1 to indicate the selected sample is the higher gain mode sample and a bit of value 0 to indicate the selected sample is the lower gain mode sample, or vice versa. The decision logic 1305 may provide digitized pixel values (e.g., digitized representations of outputs of the amplifier arrangement 905) together with one or more associated bits for each digitized pixel value to provide an indication to downstream processing (e.g., performed by the processing pipeline 210) of the selected imaging mode for the digitized pixel value.

In some cases, the ADC circuit 1310 and 1315 may each include or may be coupled to one or more switches and/or one or more reactive elements (e.g., capacitors) controlled with appropriate control signals and associated timing to allow digitizing of an output from the amplifier arrangement 905 or the LPF 1010. For example, the ADC circuit 1310 may include and/or may be coupled to a sample-and-hold circuit formed of a switch and a capacitor. The switch may be selectively open or closed to facilitate sampling of the lower gain mode sample at $t=T_1$ and holding of the lower gain mode signal from the amplifier arrangement 905 and digitizing of the held low-gain mode signal. Similarly, for example, the ADC circuit 1315 may include and/or may be coupled to a sample-and-hold circuit formed of a switch and a capacitor. The switch may be selectively open or closed to facilitate sampling and holding of the higher gain mode signal from the amplifier arrangement 905 and digitizing of the held higher gain mode signal.

Although FIG. 13 illustrates an example with two gain modes (e.g., high-gain and low-gain mode), in other embodiments, the circuit arrangement 1300 may accommodate more than two gain modes. In these embodiments, within a frame, the decision logic 1305 may adjust the amplifier arrangement 905 as appropriate to effectuate different imaging modes at different times. A sample associated with each gain mode may be captured at a respective time. For example, in a case with a high-gain mode, medium-gain mode, and low-gain mode, the circuit arrangement 1300 may be operated in the low-gain mode from $t=0$ to $t=T_1$ with the low-gain mode sampled at $t=T_1$, operated in the medium-gain mode from $t=T_1^+$ (e.g., right after $T_1$) to $t=T_2$, and operated in the high-gain mode from $t=T_2^+$ to $t=T_{line}$. In some cases, the LPF 1010 may be turned on at a time $t=T_3$ with $T_{line}>T_3>T_2$, and turned off prior to $t=T_3$.

Figure 14:
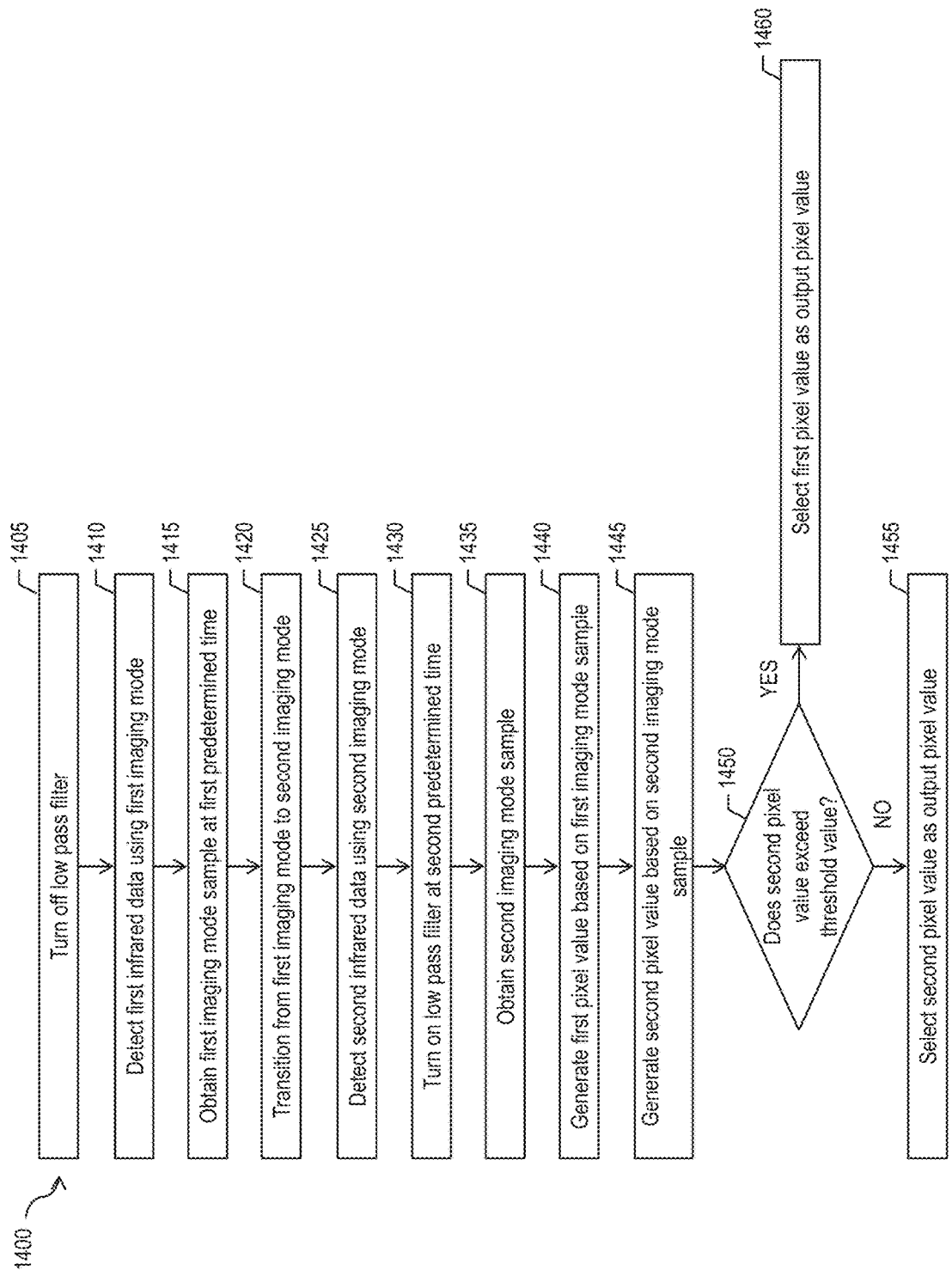
FIGS. 14 and 15 illustrate a flow diagram of example processes for facilitating IR imaging in multiple imaging modes in accordance with one or more embodiments of the present disclosure.

FIG. 14 illustrates a flow diagram of an example process 1400 for facilitating IR imaging in multiple imaging modes in accordance with one or more embodiments of the present disclosure. For explanatory purposes, the example process 1400 is primarily described herein with reference to the circuit arrangement 1300 of FIG. 13; however, the example process 1400 is not limited to the circuit arrangement 1300. Note that one or more operations may be combined, omitted, and/or performed in a different order as desired. In one or more embodiments, the blocks of FIG. 14 may be performed for each pixel of an IR image captured by the IR image capture circuit 105.

At block 1405, the LPF 1010 is turned off. The LPF 1010 may be turned off by turning the switch 1015 on (e.g., set the switch 1015 in a closed state). At block 1410, the IR image detector circuit 110 detects first infrared data using a first imaging mode (e.g., low-gain mode). The first infrared data is based on infrared radiation captured using the IR detector 805. For example, in some cases, the decision logic 1305 may cause operation of the IR image detector circuit 110 in the first imaging mode by setting the variable impedance $Z_{var}$ and/or another impedance (e.g., variance impedance Z 1115) to an impedance value associated with the first imaging mode. At block 1415, the ADC circuit 1310 obtains a first imaging mode sample at a first predetermined time $T_1$. For example, the ADC circuit 1310 may include or may be coupled to a sample-and-hold circuit that samples the first infrared data at the first predetermined time $t_1$ to obtain the first imaging mode sample and holds the first imaging mode sample at least until the first imaging mode sample is digitized by the ADC circuit 1310.

At block 1420, the decision logic 1305 generates appropriate control signals to transition the circuit arrangement 1300 from the first imaging mode to a second imaging mode (e.g., high-gain mode). The decision logic 1305 may cause operation in the second imaging mode by adjusting a gain associated with the IR image detector circuit 110, such as by adjusting the impedance value of the variance impedance $Z_{var}$. At block 1425, the IR image detector circuit 110 detects second infrared data using the second imaging mode. The second infrared data is based on infrared radiation captured using the IR detector 805. At block 1430, the LPF 1010 is turned on at a second predetermined time $t_2$ (e.g., where $T_2 > T_1$). In one case, the second predetermined time $T_2$ occurs after the IR image detector circuit 110 starts to detect the second infrared data using the second imaging mode to allow the output of the amplifier arrangement 905 to move to a new output level prior to turning on the LPF 1010. At block 1435, the ADC circuit 1315 obtains a second imaging mode sample. For example, the second imaging mode sample may be obtained at the end of the total line time $T_{line}$. The ADC circuit 1315 may include or may be coupled to a sample-and-hold circuit that samples the second infrared data at the end of the line time $T_{line}$ to obtain the second imaging mode sample and holds the second imaging mode sample at least until the second imaging mode sample is digitized by the ADC circuit 1315. An example range for the first predetermined time $T_1$ may be between $0.10T_{line}$ and $0.20T_{line}$. An example range for the second predetermined time $T_2$ may be between $0.20T_{line}$ and $0.40T_{line}$. In these examples, between $T_1$ and $T_2$, the LPF 1010 is turned off while the circuit arrangement 1300 is detecting the second infrared data using the second imaging mode.

At block 1440, the ADC circuit 1310 generates a first pixel value based on the first imaging mode sample. At block 1445, the ADC circuit 1315 generates a second pixel value based on the second imaging mode sample. For example, the first pixel value may be generated at some time after the first imaging mode sample is obtained (e.g., after $t=T_1$) and second pixel value may be generated at some time after the second imaging mode sample is obtained (e.g., after $t=T_{line}$). At block 1450, a determination is made as to whether the second pixel value exceeds a threshold value. As an example, the threshold value may be 90% of the maximum count value (e.g., 14,746 for 14 bits). When the second pixel value is determined to not exceed the threshold value, the process 1400 proceeds to block 1455. At block 1455, the decision logic 1305 selects the second pixel value as an output pixel value of the circuit arrangement 1300. When the second pixel value is determined to exceed the threshold value, the process 1400 proceeds to block 1460. At block 1460, the decision logic 1305 selects the first pixel value as the output pixel value of the circuit arrangement 1300. In an aspect, the output pixel value (e.g., the selected first or second pixel value) may be provided to an appropriate downstream pipeline for processing. In this regard, the decision logic 1305 may generate a bit or bits to indicate the imaging mode associated with the pixel value (e.g., first or second pixel value) that is selected as the output pixel value at block 1455 or 1460. The processed output pixel value may be provided for display (e.g., after application of a palette on the processed output pixel value) and/or storage.

Although the foregoing description is primarily made with reference to images having pixels associated with more than one imaging mode, in some embodiments each image may be associated with only a single imaging mode (e.g., all pixels of an image are associated with the same imaging mode).

In an embodiment, each infrared image may be associated with a single one of a plurality of imaging modes. Each imaging mode may be associated with a palette. In an aspect, the palette being used for displaying a captured and/or processed IR image may automatically change when the imaging mode changes. Such automatic change may provide a visible indication to the user that the imaging mode has changed. An easily interpretable visualization of an infrared image may differ for different users and/or different applications. By way of non-limiting example, the palettes may include a rainbow palette, a grayscale palette, an ironbow palette, a lava palette, and a medical palette. In an aspect, when displaying the infrared image, a legend associated with a palette may also be displayed with the infrared image to associate different color values (e.g., RGB values) or grayscale values (e.g., intensity values) of the infrared image with a respective temperature or temperature range.

Figure 15:
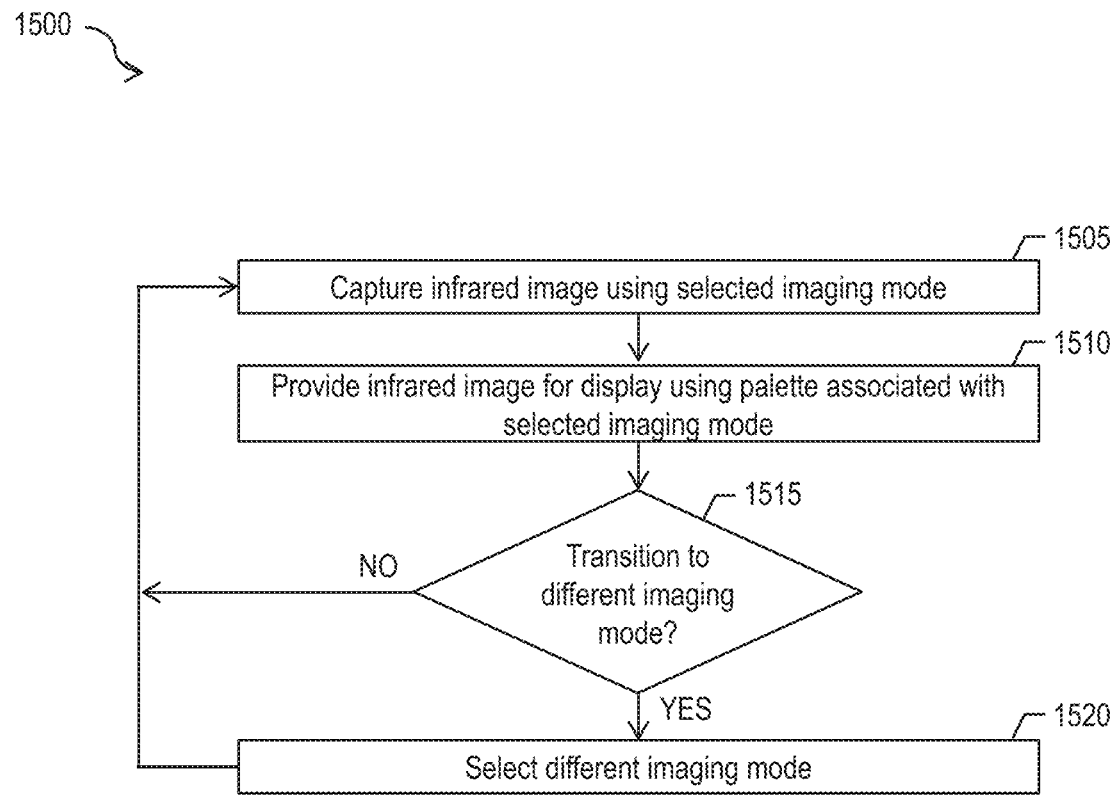

FIG. 15 illustrates a flow diagram of an example process 1500 for facilitating IR imaging in multiple imaging modes in accordance with one or more embodiments of the present disclosure. For explanatory purposes, the example process 1500 is primarily described herein with reference to the IR imaging device 100 of FIGS. 1-3; however, the example process 1500 is not limited to the IR imaging device 100 of FIGS. 1-3. Note that one or more operations may be combined, omitted, and/or performed in a different order as desired.

At block 1505, the IR image capture circuit 105 captures an infrared image using a selected imaging mode. For example, the IR image capture circuit 105 may capture infrared image data and process the captured infrared image data (e.g., using a processing pipeline associated with the selected imaging mode) to provide the infrared image. At block 1510, the IR image capture circuit 105 provides the infrared image for display using a palette associated with the selected imaging mode. In some cases, the infrared image may be displayed by the display 135. At block 1515, the IR image capture circuit 105 determines whether to transition to a different imaging mode. For example, when the selected imaging mode is a first imaging mode (e.g., high-gain mode), the IR image capture circuit 105 may make the determination to transition to a second imaging mode when at least a threshold number of pixels in the infrared image (e.g., at least 15% of the infrared image) exceeds a saturation threshold value (e.g., high-to-low saturation threshold value, such as 12,000 counts in a 14-bit case) associated with the first imaging mode. When the selected imaging mode is the second imaging mode (e.g., low-gain mode), the IR image capture circuit 105 may make the determination to transition to the first imaging mode when at least a threshold number of pixels in the infrared image is below a low-to-high saturation threshold value associated with the second imaging mode.

When the determination is not to transition to the different imaging mode, the process proceeds from block 1515 to block 1505. In this regard, the IR image capture circuit 105 captures a next infrared image using the same imaging mode used to capture the previous infrared image. When the determination is to transition to the different imaging mode, the process proceeds from block 1515 to block 1520. At block 1520, the IR image capture circuit 105 selects the different imaging mode to transition to the different imaging mode. With reference to FIG. 9, the IR image capture circuit 105 may effectuate the transition by adjusting the impedance value of the variable feedback impedance $Z_{var}$ for each detector of the IR image detector circuit 110. The process 1500 then proceeds to block 1505 for the next infrared image. As an example, the palette associated with the high-gain mode and low-gain mode may be the ironbow palette and lava palette, respectively. The transition from the high-gain mode to the low-gain mode may cause a corresponding transition from the ironbow palette to the lava palette. Such a transition in the palette used is visible to the user when displayed (e.g., via the display 135).

In one or more embodiments, a method may include operating a device that includes an infrared image capture circuit (e.g., 105) and at least one processing circuit (e.g., 120). The method may include capturing, using the infrared image capture circuit, a first infrared image associated with a first plurality of pixel values using a first imaging mode of a plurality of imaging modes. Each of the plurality of imaging modes may be associated with a respective set of characteristics. In an aspect, the set of characteristics may include at least one of sensitivity, dynamic range, minimum temperature representable by the infrared image capture circuit, or maximum temperature representable by the infrared image capture circuit. The at least one processing circuit may be communicatively coupled to the infrared image capture circuit. The method may further include determining, using the at least one processing circuit, whether at least a threshold number of the first plurality of pixel values exceeds a saturation threshold value. The method may further include, using the at least one processing circuit, maintaining the device in the first imaging mode when less than the threshold number of the first plurality of pixel values is determined to exceed the saturation threshold value, and transitioning the device from the first imaging mode to a different mode state when at least the threshold number of the first plurality of pixel values is determined to exceed the saturation threshold value. In some cases, the first imaging mode (e.g., high-gain mode) may be associated with a lower dynamic range than each remaining imaging mode (e.g., low-gain mode) of the plurality of imaging modes.

In some aspects, the method may include capturing, using the infrared image capture circuit, the first infrared image by detecting first infrared data and generating the first plurality of pixel values based on the first infrared data and the first imaging mode. The infrared image capture circuit may include a plurality of infrared detector circuits. Each of the plurality of infrared detector circuits may be configured to capture a respective portion of the first infrared image by detecting a respective portion of the first infrared data and generating a respective one of the first plurality of pixel values based on the first imaging mode and the respective portion of the first infrared data. The first infrared image may be formed of the first plurality of pixel values.

In some aspects, the different mode state may be a superframing state. The superframing state may be associated with capture of each of at least two infrared images using different imaging modes of the plurality of imaging modes. When the device is in the superframing state, the method may further include, using the infrared image capture circuit, capturing a second infrared image using the first imaging mode (e.g., high-gain mode), and capturing each of at least one other infrared image using a respective imaging mode of the plurality of imaging modes, where each respective imaging mode (e.g., low-gain mode, medium-gain mode, etc.) may be different from the first imaging mode. The method may further include, generating a combined infrared image based on the second infrared image and each of the at least one other infrared image using the at least one processing circuit.

In some cases, the at least one other infrared image may include a third infrared image captured using a second imaging mode of the plurality of imaging modes. To generate the combined infrared image, the method may include determining a set of pixel values associated with portions of the third infrared image that correspond to portions of the second infrared image associated with pixel values determined to exceed the saturation threshold value, and generating the combined infrared image based on pixel values associated with the second infrared image determined not to exceed the saturation threshold value and the set of pixel values.

The method may further include, using the at least one processing circuit, providing the first infrared image for display using a first palette associated with the first imaging mode, and providing at least a portion of the combined infrared image for display using a second palette different from the first palette. In some cases, the method may further include displaying, using one or more displays (e.g., 135), the first infrared image using the first palette and the portion the combined infrared image using the second palette.

In some aspects, the different mode state may be a second imaging mode of the plurality of imaging modes. In some cases, the second imaging mode may be any imaging mode that is associated with a higher dynamic range than the first imaging mode. In such aspects, the method may further include, using the infrared image capture circuit, capturing a second infrared image associated with a second plurality of pixel values using the second imaging mode when at least the threshold number of the first plurality of pixel values is determined to exceed the saturation threshold value. The method may further include, using the at least one processing circuit, providing the first infrared image for display using a first palette associated with the first imaging mode, and providing the second infrared image for display using a second palette associated with the second imaging mode. In some cases, the method may further include displaying, using one or more displays, the first infrared image using the first palette and the second infrared image using the second palette.

In one or more embodiments, a method may include operating a device that includes an infrared image capture circuit (e.g., 105) and at least one processing circuit (e.g., 120). The method may include, using the infrared image capture circuit, detecting first infrared data and generating a first pixel value based on the first infrared data and a first imaging mode (e.g., low-gain mode, high-gain mode) of a plurality of imaging modes. The method may further include, using the at least one processing circuit, comparing the first pixel value to a first set of saturation threshold values associated with the first imaging mode, selecting an imaging mode among the plurality of imaging modes based on the comparison of the first pixel value, and setting the infrared image capture circuit to provide an output pixel value based on the imaging mode selected based on the comparison of the first pixel value. In some cases, the method may include providing, using the at least one processor circuit, the output pixel value for display based on a palette associated with the selected imaging mode. In some cases, a readout circuit (e.g., 115) of the infrared image capture circuit may include the at least one processing circuit.

In some aspects, the infrared image capture circuit may include an infrared detector (e.g., 805) configured to detect the first infrared data, an amplifier arrangement (e.g., 905, 1110) coupled to the infrared detector, a low pass filter (e.g., 1010) coupled to the amplifier arrangement, and an analog-to-digital converter circuit (e.g., 820) coupled to the low pass filter and configured to generate the first pixel value. In some cases, the first imaging mode may be the high-gain mode. In some cases, the first imaging mode may be an imaging mode that has a lowest dynamic range and a highest sensitivity relative to remaining imaging modes of the plurality of imaging modes.

The low pass filter may be turned off between a first predetermined time (e.g., $t=T_0=0$) and a second predetermined time (e.g., $t=T_1$). The low pass filter may be turned on at the second predetermined time. The method may further include, using the at least one processing circuit, selecting the imaging mode by a third predetermined time (e.g., $t=T_2$) between the first and second predetermined times. In some cases, the method may further include, using the at least one processing circuit, adjusting a gain associated with the device to transition from the first imaging mode to the selected imaging mode. For example, the gain may be adjusted by adjusting a variable feedback impedance of an amplifier arrangement, such as variable impedance $Z_{var}$ of FIG. 10.

In some aspects, the method may further include detecting second infrared data and generating a second pixel value based on the second infrared data and a second imaging mode of the plurality of imaging modes. In some cases, the second imaging mode is associated with a higher dynamic range than the first imaging mode. In other cases, the second imaging mode is associated with a lower dynamic range than the first imaging mode.

The method may further include selecting, using the at least one processing circuit, the first imaging mode when the first pixel value does not exceed any saturation threshold value among the first set of saturation threshold values. In some cases, the method may further include selecting, using the at least one processing circuit, the second imaging mode when the first pixel value exceeds at least one saturation threshold value among the first set of saturation threshold values. The output pixel value may be based on the first pixel value when the first imaging mode is the selected imaging mode. The output pixel value may be based on the second pixel value when the second imaging mode is the selected imaging mode. In such cases, the second imaging mode may be associated with a lower dynamic range than the first imaging mode.

In some aspects, the infrared image capture circuit may include a first analog-to-digital converter circuit and a second analog-to-digital converter circuit. The method may further include, sampling, using the first analog-to-digital converter circuit, the first pixel value at a first predetermined time and digitizing the first pixel value to obtain a digitized first pixel value. The method may further include sampling, using the second analog-to-digital converter circuit, the second pixel value at a second predetermined time and digitizing the second pixel value to obtain a digitized second pixel value. The method may further include selecting, using the at least one processing circuit, the second imaging mode when the first pixel value exceeds at least one saturation threshold value among the first set of saturation threshold values. Depending on the imaging mode that is selected, the output pixel value may be based on the digitized first pixel value or the digitized second pixel value. In an aspect, the infrared image capture circuit may further include a low pass filter that is configured to be turned off prior to a third predetermined time that is between the first and second predetermined times. The first predetermined time may be a total line time (e.g., $T_{line}$). The second predetermined time may be prior to the first predetermined time.

In some aspects, the imaging mode selected based on the comparison of the first pixel value may include a second imaging mode of the plurality of imaging modes. The method may further include, generating, using the infrared image capture circuit, the output pixel value based on the second imaging mode. The method may further include, using the at least one processing circuit, generating an infrared image that includes the first pixel value and the output pixel value. The method may further include, using the at least one processing circuit, comparing the output pixel value to a second set of saturation threshold values associated with the second imaging mode, selecting an imaging mode among the plurality of imaging modes based on the comparison of the output pixel value, and setting the infrared image capture circuit to generate a second pixel value based on the selection made based on the comparison of the output pixel value.

In some aspects, the method may further include, using the infrared image capture circuit, detecting second infrared data subsequent to detecting the first infrared data, and generating the output pixel value based on the second infrared data and the imaging mode selected based on the comparison of the first pixel value. The method may further include, using the infrared image capture circuit, generating a first infrared image based on the first infrared data and generating a second infrared image based on the second infrared data. The first infrared image includes the first pixel value. The second infrared image includes the output pixel value. In some cases, the first infrared image may be associated with a plurality of pixel coordinates, the second infrared image may be associated with the same plurality of pixel coordinates, and the first pixel value and the output pixel value may be associated with the same pixel coordinate among the plurality of pixel coordinates.

In one or more embodiments, a method may include operating a device that includes an infrared image capture circuit (e.g., 105) and at least one processing circuit (e.g., 120). The method may include capturing, using the infrared image capture circuit, a first infrared image based on a first imaging mode (e.g., low-gain mode, high-gain mode) of a plurality of imaging modes. The method may include providing, using the at least one processing circuit, the infrared image for display using a first palette associated with the first imaging mode. The method may include determining, using the at least one processing circuit, whether to transition to a second imaging mode of the plurality of imaging modes based on the infrared image, where the second imaging mode is different from the first imaging mode. The method may include transitioning, using the at least one processing circuit, to the different imaging mode when the determination is to transition to the different imaging mode. The transitioning may include transitioning from using the first palette to using a second palette associated with the second imaging mode. As an example, the palette associated with a high-gain mode and low-gain mode may be the ironbow palette and lava palette, respectively. In an aspect, the transitioning may include transitioning to the second imaging mode when at least a threshold number of pixels in the first infrared image exceed a saturation threshold value associated with the first imaging mode. The method may further include capturing, using the infrared image capture circuit, a second infrared image based on the second imaging mode, and providing, using the at least one processing circuit, the infrared image for display using the second palette.

Although the foregoing description is primarily made with reference to dual imaging modes, one or more embodiments of the present disclosure are also applicable to n imaging modes, where n>2. For example, one or more amplifier arrangements (e.g., the amplifier arrangements 810, 815, 905) may be utilized to implement n=4 imaging modes, and the decision logic (e.g., the decision logic 825, 910, 1005, 1105, 1305) may be utilized to select an optimum imaging mode based on a set of conditions. Based on a current pixel of a current IR image operated in a given imaging mode, and associated transition threshold values, the optimum imaging mode may be selected for a next pixel in a next IR image and/or a next pixel in the current IR image. For example, when the current pixel is operated on a first imaging mode, the transition threshold values may include a first-to-second mode transition threshold value, a first-to-third mode transition threshold value, and a first-to-fourth mode transition threshold value. Similarly, the second, third, and fourth imaging modes are each associated with a respective set of three transition threshold values.

According to embodiments, there is provided a machine-readable medium (e.g., computer-readable medium) on which is stored non-transitory information configured to control the components of the IR imaging device 100, such as the IR image capture circuit 105 and the processing circuit 120, to perform any of the steps or functions described herein. According to embodiments, there is provided a computer program product comprising code portions adapted to control the components of the IR imaging device 100 to perform any of the steps or functions described herein. It is noted that an index/identifier (e.g., first, second, third) associated with imaging modes (e.g., first, second, third imaging modes) and predetermined times (e.g., first, second, third predetermined times) may be arbitrary and utilized for convenience in differentiating the different imaging modes and different predetermined times. For example, in one case, the first imaging mode and second imaging mode may refer to the high-gain mode and low-gain mode, respectively. In another case, the first imaging mode and second imaging mode may refer to the low-gain mode and high-gain mode, respectively. As another example, the first predetermined time may be the same as, prior to, or after, the second predetermined time.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A device, comprising:
    an infrared image capture circuit configured to capture a first infrared image associated with a first plurality of pixel values using a first imaging mode of a plurality of imaging modes, wherein each of the plurality of imaging modes is associated with a respective set of characteristics; and
    at least one processing circuit communicatively coupled to the infrared image capture circuit and configured to:
        determine whether at least a threshold number of the first plurality of pixel values exceeds a saturation threshold value;
        maintain the device in the first imaging mode when less than the threshold number of the first plurality of pixel values is determined to exceed the saturation threshold value; and
        transition the device from the first imaging mode to a superframing state when at least the threshold number of the first plurality of pixel values is determined to exceed the saturation threshold value, wherein the superframing state is associated with capture of each of at least two infrared images using different imaging modes of the plurality of imaging modes.

2. The device of claim 1, wherein when the device is in the superframing state:
    the infrared image capture circuit is further configured to:
        capture a second infrared image using the first imaging mode; and
        capture each of at least one other infrared image using a respective imaging mode of the plurality of imaging modes, wherein each respective imaging mode is different from the first imaging mode; and
    the at least one processing circuit is further configured to generate a combined infrared image based on the second infrared image and each of the at least one other infrared image.

3. The device of claim 2, wherein:
    the at least one other infrared image comprises a third infrared image captured using a second imaging mode of the plurality of imaging modes, and
    the at least one processing circuit is configured to generate the combined infrared image by:
        determining a set of pixel values associated with portions of the third infrared image that correspond to portions of the second infrared image associated with pixel values determined to exceed the saturation threshold value; and
        generating the combined infrared image based on pixel values associated with the second infrared image determined not to exceed the saturation threshold value and the set of pixel values.

4. The device of claim 3, wherein the at least one processing circuit is further configured to:
    provide the first infrared image for display using a first palette associated with the first imaging mode; and provide at least a portion of the combined infrared image for display using a second palette different from the first palette, wherein the first imaging mode is associated with a lower dynamic range than each remaining imaging mode of the plurality of imaging modes.

5. The device of claim 2, wherein the second infrared image comprises a second plurality of pixel values, and wherein the at least one processing circuit is further configured to:

determine a number of pixel values of the second plurality of pixel values that exceeds a second saturation threshold value; and transition the device from the superframing state to the first imaging mode when the number of pixel values of the second plurality of pixel values that exceeds the second saturation threshold value is below a second threshold number.

6. The device of claim 1, wherein:

the infrared image capture circuit is configured to capture the first infrared image by detecting first infrared data and generating the first plurality of pixel values based on the first infrared data and the first imaging mode, the infrared image capture circuit comprises a plurality of infrared detector circuits, each of the plurality of infrared detector circuits is configured to capture a respective portion of the first infrared image by detecting a respective portion of the first infrared data and generating a respective one of the first plurality of pixel values based on the first imaging mode and the respective portion of the first infrared data, and the first infrared image is formed of the first plurality of pixel values.

7. The device of claim 1, wherein the respective set of characteristics comprises at least one of sensitivity, dynamic range, minimum temperature representable by the infrared image capture circuit, or maximum temperature representable by the infrared image capture circuit.

8. A device, comprising:

an infrared image capture circuit configured to detect first infrared data and generate a first pixel value based on the first infrared data and a first imaging mode of a plurality of imaging modes; and at least one processing circuit configured to:

compare the first pixel value to a first set of saturation threshold values associated with the first imaging mode;

select an imaging mode among the plurality of imaging modes based on the comparison of the first pixel value; and set the infrared image capture circuit to provide an output pixel value based on the imaging mode selected based on the comparison of the first pixel value;

the infrared image capture circuit further configured to generate the output pixel value based on the first infrared data and the imaging mode selected based on the comparison; and the at least one processing circuit further configured to generate an infrared image comprising the first pixel value and the output pixel value.

9. The device of claim 8, wherein the infrared image capture circuit comprises:

an infrared detector configured to detect the first infrared data;

an amplifier arrangement coupled to the infrared detector and configured to generate an amplifier output based on the first infrared data;

a low pass filter coupled to the amplifier arrangement and configured to selectively filter the amplifier output to generate a filtered output; and an analog-to-digital converter circuit coupled to the low pass filter and configured to generate the first pixel value based on the amplifier output when the low pass filter is turned off and the filtered output when the low pass filter is turned on.

10. The device of claim 9, wherein:

the low pass filter is turned off between a first predetermined time and a second predetermined time, the low pass filter is turned on at the second predetermined time, and the at least one processing circuit is configured to select the imaging mode by a third predetermined time between the first and second predetermined times.

11. The device of claim 8, wherein:

the infrared image capture circuit is further configured to detect second infrared data and generate a second pixel value based on the second infrared data and a second imaging mode of the plurality of imaging modes, and the output pixel value is based on the second pixel value when the second imaging mode is the selected imaging mode.

12. The device of claim 11, wherein:

the at least one processing circuit is configured to select the first imaging mode when the first pixel value does not exceed any saturation threshold value among the first set of saturation threshold values, the output pixel value is based on the first pixel value when the first imaging mode is the selected imaging mode, and the second imaging mode is associated with a higher dynamic range than the first imaging mode.

13. The device of claim 11, wherein the infrared image capture circuit comprises:

a first analog-to-digital converter (ADC) circuit configured to sample the first pixel value at a first predetermined time and digitize the first pixel value to obtain a digitized first pixel value; and a second ADC circuit configured to sample the second pixel value at a second predetermined time and digitize the second pixel value to obtain a digitized second pixel value, wherein:

the output pixel value is based on the digitized first pixel value or the digitized second pixel value, the at least one processing circuit is configured to select the second imaging mode when the first pixel value exceeds at least one saturation threshold value among the first set of saturation threshold values, and a readout circuit of the infrared image capture circuit comprises the at least one processing circuit.

14. The device of claim 13, wherein the infrared image capture circuit further comprises:

a low pass filter that is configured to be turned off prior to a third predetermined time that is between the first and second predetermined times, wherein:

the second predetermined time is prior to the first predetermined time, the first predetermined time is a total line time, and the first imaging mode is associated with a lower dynamic range than the second imaging mode.

15. The device of claim 8, wherein the at least one processing circuit is further configured to provide the output pixel value for display based on a palette associated with the selected imaging mode.

16. The device of claim 8, wherein:
the imaging mode selected based on the comparison of the first pixel value comprises a second imaging mode of the plurality of imaging modes;
the at least one processing circuit is further configured to:
compare the output pixel value to a second set of saturation threshold values associated with the second imaging mode;
select an imaging mode among the plurality of imaging modes based on the comparison of the output pixel value; and
set the infrared image capture circuit to generate a second pixel value based on the selection made based on the comparison of the output pixel value, wherein the infrared image comprises the first pixel value, the second pixel value, and the output pixel value.

17. A device, comprising:
an infrared image capture circuit configured to:
detect first infrared data;
generate a first pixel value based on the first infrared data and a first imaging mode of a plurality of imaging modes; and
generate a second pixel value based on the first infrared data and a second imaging mode of the plurality of imaging modes; and
at least one processing circuit configured to:
compare the first pixel value to a first set of saturation threshold values associated with the first imaging mode;
compare the second pixel value to a second set of saturation threshold values associated with the second imaging mode;
select, for a third pixel value, an imaging mode among the plurality of imaging modes based on the comparison of the first pixel value; and
select, for a fourth pixel value, an imaging mode among the plurality of imaging modes based on the comparison of the second pixel value;
wherein the infrared image capture circuit is further configured to:
detect second infrared data subsequent to detecting the first infrared data;
generate the third pixel value based on the second infrared data and the imaging mode selected for the third pixel value based on the comparison of the first pixel value;
generate the fourth pixel value based on the second infrared data and the imaging mode selected for the fourth pixel value based on the comparison of the second pixel value;
wherein the at least one processing circuit is further configured to:
generate a first infrared image comprising the first pixel value and the second pixel value; and
generate a second infrared image comprising the third pixel value and the fourth pixel value,
wherein:
the first infrared image is associated with a plurality of pixel coordinates,
the second infrared image is associated with the plurality of pixel coordinates,
the first pixel value and the third pixel value are associated with the same pixel coordinate among the plurality of pixel coordinates, and
the second pixel value and the fourth pixel value are associated with the same pixel coordinate among the plurality of pixel coordinates.

18. The device of claim 17, wherein the infrared image capture circuit comprises:
an infrared detector configured to detect the first infrared data;
an amplifier arrangement coupled to the infrared detector and configured to generate an amplifier output based on the first infrared data; and
a low pass filter coupled to the amplifier arrangement and configured to selectively filter the amplifier output to generate a filtered output, wherein the first pixel value is based on the first infrared data and one of the amplifier output or the filtered output.

19. The device of claim 18, wherein:
the low pass filter is turned off between a first predetermined time and a second predetermined time,
the low pass filter is turned on at the second predetermined time, and
the at least one processing circuit is configured to select the imaging mode for the third pixel value by a third predetermined time between the first and second predetermined times.

20. The device of claim 17, wherein the at least one processing circuit is further configured to provide the third pixel value for display based on a palette associated with the selected imaging mode for the third pixel value.

* * * * *

UNITED STATES PATENT AND TRADEMARK OFFICE
CERTIFICATE OF CORRECTION

PATENT NO.         : 11,108,967 B2                                         Page 1 of 1
APPLICATION NO.    : 16/511401
DATED              : August 31, 2021
INVENTOR(S)        : Kostrzewa et al.

It is certified that error appears in the above-identified patent and that said Letters Patent is hereby corrected as shown below:

In the Specification

In the Cross-Reference to Related Applications:

Column 1, Lines 20-21, change "patent application Ser. No." to --Patent Application No.--.

In the Summary:

Column 2, Line 39, change "using is a first imaging mode" to --using a first imaging mode--.

In the Detailed Description:

Column 33, Line 32, change "$0.20T_{fine}$" to --$0.20T_{line}$--.

Column 36, Line 6, change "$T_0$ generate the combined infrared image" to --To generate the combined infrared image--.

Column 39, Line 7, change "n>2" to --n ≥ 2--.

Signed and Sealed this
Tenth Day of May, 2022

Katherine Kelly Vidal
*Director of the United States Patent and Trademark Office*